(12) United States Patent
Kamath et al.

(10) Patent No.: US 8,948,003 B2
(45) Date of Patent: *Feb. 3, 2015

(54) FAULT TOLERANT COMMUNICATION IN A TRILL NETWORK

(75) Inventors: Dayavanti G Kamath, Santa Clara, CA (US); Keshav Kamble, Fremont, CA (US); Dar-Ren Leu, San Jose, CA (US); Vijoy A Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 13/315,443

(22) Filed: Dec. 9, 2011

(65) Prior Publication Data

US 2012/0320739 A1    Dec. 20, 2012

Related U.S. Application Data

(60) Provisional application No. 61/498,316, filed on Jun. 17, 2011.

(51) Int. Cl.
*H04L 12/24* (2006.01)
*H04L 12/721* (2013.01)
*H04L 12/709* (2013.01)
*H04L 12/703* (2013.01)

(52) U.S. Cl.
CPC ............ *H04L 41/0654* (2013.01); *H04L 45/66* (2013.01); *H04L 45/245* (2013.01); *H04L 45/28* (2013.01); *Y02B 60/33* (2013.01)
USPC .......................................... 370/225; 370/392

(58) Field of Classification Search
CPC ... H04L 41/0654; H04L 45/245; H04L 45/28; H04L 45/66
See application file for complete search history.

(56) References Cited

U.S. PATENT DOCUMENTS

| 5,394,402 | A | 2/1995 | Ross |
| 5,515,359 | A | 5/1996 | Zheng |
| 5,617,421 | A | 4/1997 | Chin et al. |
| 5,633,859 | A | 5/1997 | Jain et al. |
| 5,633,861 | A | 5/1997 | Hanson et al. |

(Continued)

FOREIGN PATENT DOCUMENTS

| CN | 1897567 | 1/2007 |
| CN | 101030959 A | 9/2007 |

(Continued)

OTHER PUBLICATIONS

D.E. Eastlake, "RBridges and the IETF TRILL Protocol", pp. 1-39, TRILL Protocol, Dec. 2009.*

(Continued)

*Primary Examiner* — Joseph Bednash
(74) *Attorney, Agent, or Firm* — Russell Ng PLLC; Matthew Baca

(57) ABSTRACT

Each of first and second bridges of a data network having respective external links to an external node implement a network bridge component that forwards traffic inside the network and a virtual bridge component that forwards traffic outside of the network. A virtual bridge is formed including the virtual bridge components of the first and second bridges and an interswitch link (ISL) between the virtual bridge components of the first and second bridges. Data frames are redirected via the ISL in response to a link-down condition of one of the external links.

10 Claims, 26 Drawing Sheets

(56) References Cited

U.S. PATENT DOCUMENTS

| | | | |
|---|---|---|---|
| 5,742,604 A | 4/1998 | Edsall et al. | |
| 5,832,484 A | 11/1998 | Sankaran et al. | |
| 5,893,320 A | 4/1999 | Demaree | |
| 6,147,970 A | 11/2000 | Troxel | |
| 6,304,901 B1 | 10/2001 | McCloghrie et al. | |
| 6,347,337 B1 | 2/2002 | Shah et al. | |
| 6,567,403 B1 | 5/2003 | Congdon et al. | |
| 6,646,985 B1 | 11/2003 | Park et al. | |
| 6,839,768 B2 | 1/2005 | Ma et al. | |
| 6,901,452 B1 | 5/2005 | Bertagna | |
| 6,977,930 B1 | 12/2005 | Epps et al. | |
| 6,992,984 B1 | 1/2006 | Gu | |
| 7,035,220 B1 | 4/2006 | Simcoe | |
| 7,173,934 B2 * | 2/2007 | Lapuh et al. | 370/392 |
| 7,263,060 B1 | 8/2007 | Garofalo et al. | |
| 7,475,397 B1 | 1/2009 | Garthwaite et al. | |
| 7,483,370 B1 | 1/2009 | Dayal et al. | |
| 7,508,763 B2 | 3/2009 | Lee | |
| 7,561,517 B2 | 7/2009 | Klinker et al. | |
| 7,593,320 B1 | 9/2009 | Cohen et al. | |
| 7,668,966 B2 | 2/2010 | Klinker et al. | |
| 7,830,793 B2 | 11/2010 | Gai et al. | |
| 7,839,777 B2 | 11/2010 | DeCusatis et al. | |
| 7,848,226 B2 | 12/2010 | Morita | |
| 7,912,003 B2 | 3/2011 | Radunovic et al. | |
| 7,974,223 B2 | 7/2011 | Zelig et al. | |
| 8,085,657 B2 | 12/2011 | Legg | |
| 8,139,358 B2 | 3/2012 | Tambe | |
| 8,194,534 B2 | 6/2012 | Pandey et al. | |
| 8,194,674 B1 | 6/2012 | Pagel et al. | |
| 8,204,061 B1 | 6/2012 | Sane et al. | |
| 8,213,429 B2 | 7/2012 | Wray et al. | |
| 8,265,075 B2 | 9/2012 | Pandey | |
| 8,271,680 B2 | 9/2012 | Salkewicz | |
| 8,307,422 B2 | 11/2012 | Varadhan et al. | |
| 8,325,598 B2 | 12/2012 | Krzanowski | |
| 8,345,697 B2 | 1/2013 | Kotha et al. | |
| 8,400,915 B1 | 3/2013 | Brown et al. | |
| 8,406,128 B1 | 3/2013 | Brar et al. | |
| 8,498,284 B2 | 7/2013 | Pani et al. | |
| 8,498,299 B2 | 7/2013 | Katz et al. | |
| 8,509,069 B1 | 8/2013 | Poon et al. | |
| 8,514,857 B2 | 8/2013 | Jeong et al. | |
| 8,625,427 B1 | 1/2014 | Terry et al. | |
| 8,649,370 B2 | 2/2014 | Larsson et al. | |
| 8,730,963 B1 * | 5/2014 | Grosser et al. | 370/392 |
| 8,750,307 B2 | 6/2014 | Kamble et al. | |
| 2001/0043564 A1 | 11/2001 | Bloch et al. | |
| 2002/0191628 A1 | 12/2002 | Liu et al. | |
| 2003/0185206 A1 | 10/2003 | Jayakrishnan | |
| 2004/0031030 A1 | 2/2004 | Kidder et al. | |
| 2004/0088451 A1 | 5/2004 | Han | |
| 2004/0243663 A1 | 12/2004 | Johanson et al. | |
| 2004/0255288 A1 | 12/2004 | Hashimoto et al. | |
| 2005/0047334 A1 | 3/2005 | Paul et al. | |
| 2005/0047405 A1 | 3/2005 | Denzel et al. | |
| 2005/0213504 A1 | 9/2005 | Enomoto et al. | |
| 2006/0029072 A1 | 2/2006 | Perera et al. | |
| 2006/0092842 A1 | 5/2006 | Beukema et al. | |
| 2006/0092974 A1 | 5/2006 | Lakshman et al. | |
| 2006/0153078 A1 | 7/2006 | Yasui | |
| 2006/0251067 A1 | 11/2006 | DeSanti et al. | |
| 2007/0036178 A1 | 2/2007 | Hares et al. | |
| 2007/0157200 A1 | 7/2007 | Hopkins | |
| 2007/0263640 A1 | 11/2007 | Finn | |
| 2008/0205377 A1 | 8/2008 | Chao et al. | |
| 2008/0216080 A1 | 9/2008 | Cavage et al. | |
| 2008/0225712 A1 | 9/2008 | Lange | |
| 2008/0228897 A1 | 9/2008 | Ko | |
| 2009/0037927 A1 | 2/2009 | Sangili et al. | |
| 2009/0125882 A1 | 5/2009 | Frigo et al. | |
| 2009/0129385 A1 | 5/2009 | Wray et al. | |
| 2009/0185571 A1 | 7/2009 | Tallet | |
| 2009/0213869 A1 | 8/2009 | Rajendran et al. | |
| 2009/0252038 A1 | 10/2009 | Cafiero et al. | |
| 2009/0271789 A1 | 10/2009 | Babich | |
| 2010/0054129 A1 | 3/2010 | Kuik et al. | |
| 2010/0054260 A1 | 3/2010 | Pandey et al. | |
| 2010/0077179 A1 * | 3/2010 | Stillwell et al. | 712/30 |
| 2010/0097926 A1 * | 4/2010 | Huang et al. | 370/219 |
| 2010/0158024 A1 | 6/2010 | Sajassi et al. | |
| 2010/0183011 A1 | 7/2010 | Chao | |
| 2010/0223397 A1 | 9/2010 | Elzur | |
| 2010/0226368 A1 | 9/2010 | Mack-Crane et al. | |
| 2010/0242043 A1 | 9/2010 | Shorb | |
| 2010/0246388 A1 | 9/2010 | Gupta et al. | |
| 2010/0257263 A1 | 10/2010 | Casado et al. | |
| 2010/0265824 A1 | 10/2010 | Chao et al. | |
| 2010/0303075 A1 | 12/2010 | Tripathi et al. | |
| 2011/0007746 A1 | 1/2011 | Mudigonda et al. | |
| 2011/0019678 A1 | 1/2011 | Mehta et al. | |
| 2011/0026403 A1 | 2/2011 | Shao et al. | |
| 2011/0026527 A1 | 2/2011 | Shao et al. | |
| 2011/0032944 A1 | 2/2011 | Elzur et al. | |
| 2011/0035494 A1 | 2/2011 | Pandey et al. | |
| 2011/0103389 A1 | 5/2011 | Kidambi et al. | |
| 2011/0134793 A1 | 6/2011 | Elsen et al. | |
| 2011/0235523 A1 | 9/2011 | Jha et al. | |
| 2011/0280572 A1 | 11/2011 | Vobbilisetty et al. | |
| 2011/0299406 A1 | 12/2011 | Vobbilisetty et al. | |
| 2011/0299409 A1 | 12/2011 | Vobbilisetty et al. | |
| 2011/0299532 A1 | 12/2011 | Yu et al. | |
| 2011/0299533 A1 | 12/2011 | Yu et al. | |
| 2011/0299536 A1 | 12/2011 | Cheng et al. | |
| 2012/0014261 A1 | 1/2012 | Salam et al. | |
| 2012/0014387 A1 | 1/2012 | Dunbar et al. | |
| 2012/0016970 A1 | 1/2012 | Shah et al. | |
| 2012/0027017 A1 * | 2/2012 | Rai et al. | 370/392 |
| 2012/0033541 A1 | 2/2012 | Jacob Da Silva et al. | |
| 2012/0117228 A1 | 5/2012 | Gabriel et al. | |
| 2012/0131662 A1 | 5/2012 | Kuik et al. | |
| 2012/0163164 A1 | 6/2012 | Terry et al. | |
| 2012/0177045 A1 | 7/2012 | Berman | |
| 2012/0226866 A1 | 9/2012 | Bozek et al. | |
| 2012/0228780 A1 | 9/2012 | Kim et al. | |
| 2012/0243539 A1 | 9/2012 | Keesara | |
| 2012/0243544 A1 | 9/2012 | Keesara | |
| 2012/0287786 A1 | 11/2012 | Kamble et al. | |
| 2012/0287787 A1 | 11/2012 | Kamble et al. | |
| 2012/0287939 A1 | 11/2012 | Leu et al. | |
| 2012/0320749 A1 | 12/2012 | Kamble et al. | |
| 2013/0022050 A1 | 1/2013 | Leu et al. | |
| 2013/0051235 A1 | 2/2013 | Song et al. | |
| 2013/0064067 A1 | 3/2013 | Kamath et al. | |
| 2013/0064068 A1 | 3/2013 | Kamath et al. | |
| 2013/0314707 A1 | 11/2013 | Shastri et al. | |

FOREIGN PATENT DOCUMENTS

| | | |
|---|---|---|
| CN | 101087238 | 12/2007 |
| EP | 0853405 | 7/1998 |

OTHER PUBLICATIONS

Dar-Ren Leu, "dLAG-DMLT over TRILL", BLADE Network Technologies, pp. 1-20, Copyright 2009.*

Brocade, "BCEFE in a Nutshell First Edition", Global Education Services Revision 0111, pp. 1-70, Copyright 2011 Brocade Communications Systems, Inc.

Martin, et al., "Accuracy and Dynamics of Multi-Stage Load Balancing for Multipath Internet Routing", Institute of Computer Science, Univ. of Wurzburg Am Hubland, Germany, IEEE Int'l Conference on Communications (ICC) Glasgow, UK, pp. 1-8, Jun. 2007.

Kinds, et al., "Advanced Network Monitoring Brings Life to the Awareness Plane", IBM Research Spyros Denazis, Univ. of Patras Benoit Claise, Cisco Systems, IEEE Communications Magazine, pp. 1-7, Oct. 2008.

Kandula, et al., "Dynamic Load Balancing Without Packet Reordering", ACM SIGCOMM Computer Communication Review, vol. 37, No. 2, pp. 53-62, Apr. 2007.

Vazhkudai, et al., "Enabling the Co-Allocation of Grid Data Transfers", Department of Computer and Information Sciences, The Univ. of Mississippi, pp. 44-51, Nov. 17, 2003.

(56) References Cited

OTHER PUBLICATIONS

Xiao, et al. "Internet QoS: A Big Picture", Michigan State University, IEEE Network, pp. 8-18, Mar./Apr. 1999.
Jo et al., "Internet Traffic Load Balancing using Dynamic Hashing with Flow Volume", Conference Title: Internet Performance and Control of Network Systems III, Boston, MA pp. 1-12, Jul. 30, 2002.
Schueler et al., "TCP-Splitter: A TCP/IP Flow Monitor in Reconfigurable Hardware", Appl. Res. Lab., Washington Univ. pp. 54-59, Feb. 19, 2003.
Yemini et al., "Towards Programmable Networks"; Dept. of Computer Science Columbia University, pp. 1-11, Apr. 15, 1996.
Soule, et al., "Traffic Matrices: Balancing Measurements, Interference and Modeling", vol. 33, Issue: 1, Publisher: ACM, pp. 362-373, Year 2005.
De-Leon, "Flow Control for Gigabit", Digital Equipment Corporation (Digital), IEEE 802.3z Task Force, Jul. 9, 1996.
Schlansker, et al., "High-Performance Ethernet-Based Communications for Future Multi-Core Processors", Proceedings of the 2007 ACM/IEEE conference on Supercomputing, Nov. 10-16, 2007.
Yoshigoe, et al., "Rate Control for Bandwidth Allocated Services in IEEE 802.3 Ethernet", Proceedings of the 26th Annual IEEE Conference on Local Computer Networks, Nov. 14-16, 2001.
Tolmie, "HIPPI-6400—Designing for speed", 12th Annual Int'l Symposium on High Performance Computing Systems and Applications (HPCSt98), May 20-22, 1998.
Manral, et al., "Rbridges: Bidirectional Forwarding Detection (BFD) support for TRILL draft-manral-trill-bfd-encaps-01", pp. 1-10, TRILL Working Group Internet-Draft, Mar. 13, 2011.
Perlman, et al., "Rbridges: Base Protocol Specification", pp. 1-117, TRILL Working Group Internet-Draft, Mar. 3, 2010.
Leu, Dar-Ren, "dLAG-DMLT over TRILL", Blade Network Technologies, pp. 1-20, Copyright 2009.
Posted by Mike Fratto, "Cisco's FabricPath and IETF TRILL: Cisco Can't Have Standards Both Ways", Dec. 17, 2010; http://www.networkcomputing.com/data-networking-management/229500205.
Cisco Systems Inc., "Cisco FabricPath Overview", pp. 1-20, Copyright 2009.
Brocade, "BCEFE in a Nutshell First Edition", Global Education Services Rev. 0111, pp. 1-70, Copyright 2011, Brocade Communications Systems, Inc.
Pettit et al., Virtual Switching in an Era of Advanced Edges, pp. 1-7, Nicira Networks, Palo Alto, California. Version date Jul. 2010.
Pfaff et al., Extending Networking into the Virtualization Layer, pp. 1-6, Oct. 2009, Proceedings of the 8th ACM Workshop on Hot Topics in Networks (HotNets-VIII), New York City, New York.
Sherwood et al., FlowVisor: A Network Virtualization Layer, pp. 1-14, Oct. 14, 2009, Deutsche Telekom Inc. R&D Lab, Stanford University, Nicira Networks.
Yan et al., Tesseract: A 4D Network Control Plane, pp. 1-15, NSDI'07 Proceedings of the 4th USENIX conference on Networked systems design & implementation USENIX Association Berkeley, CA, USA 2007.
Hunter et al., BladeCenter, IBM Journal of Research and Development, vol. 49, No. 6, p. 905. Nov. 2005.
VMware, Inc., "VMware Virtual Networking Concepts", pp. 1-12, Latest Revision: Jul 29, 2007.
Perla, "Profiling User Activities on Guest OSes in a Virtual Machine Environment." (2008).
Shi et al., Architectural Support for High Speed Protection of Memory Integrity and Confidentiality in Multiprocessor Systems, pp. 1-12, Proceedings of the 13th International Conference on Parallel Architecture and Compilation Techniques (2004).
Guha et al., ShutUp: End-to-End Containment of Unwanted Traffic, pp. 1-14, (2008).
Recio et al., Automated Ethernet Virtual Bridging, pp. 1-11, IBM 2009.
Sproull et al., "Control and Configuration Software for a Reconfigurable Networking Hardware Platform", Applied Research Laboratory, Washington University, Saint Louis, MO 63130; pp. 1-10 (or 45-54)—Issue Date: 2002, Date of Current Version: Jan. 6, 2003.
Papadopoulos et al.,"NPACI Rocks: Tools and Techniques for Easily Deploying Manageable Linux Clusters", The San Diego Supercomputer Center, University of California San Diego, La Jolla, CA 92093-0505—Issue Date: 2001, Date of Current Version: Aug. 7, 2002.
Ruth et al., Virtual Distributed Environments in a Shared Infrastructure, pp. 63-69, IEEE Computer Society, May 2005.
Rouiller, Virtual LAN Security: weaknesses and countermeasures, pp. 1-49, GIAC Security Essentials Practical Assignment Version 1.4b" (2006).
Walters et al., An Adaptive Heterogeneous Software DSM, pp. 1-8, Columbus, Ohio, Aug. 14-18.
Skyrme et al., Exploring Lua for Concurrent Programming, pp. 3556-3572, Journal of Universal Computer Science, vol. 14, No. 21 (2008), submitted: Apr. 16, 2008, accepted: Jun. 5, 2008, appeared: Dec. 1, 2008.
Dobre, Multi-Architecture Operating Systems, pp. 1-82, Oct. 4, 2004.
Int'l Searching Authority; Int. Appln. PCT/IB2012/051803; Int'l Search Report dated Sep. 13, 2012 (7 pg.).

* cited by examiner

| RB | VID | DMAC | Iport | vport | ... |
|----|-----|------|-------|-------|-----|
|    |     |      |       |       |     |

FDB data structure 640

Figure 7

| RB | Iport | vport | ... |
|----|-------|-------|-----|
|    |       |       |     |

RB data structure 642

Figure 8

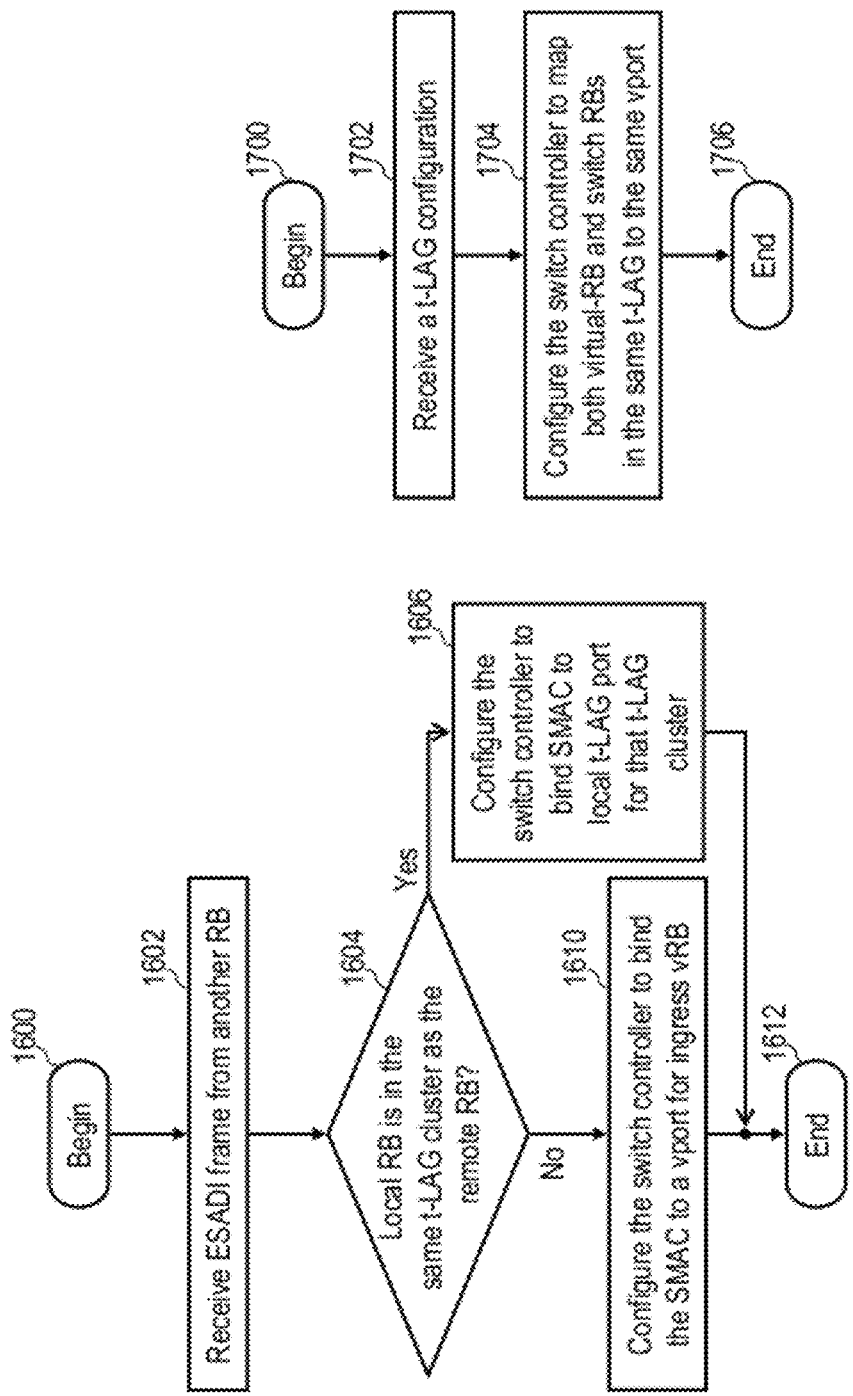

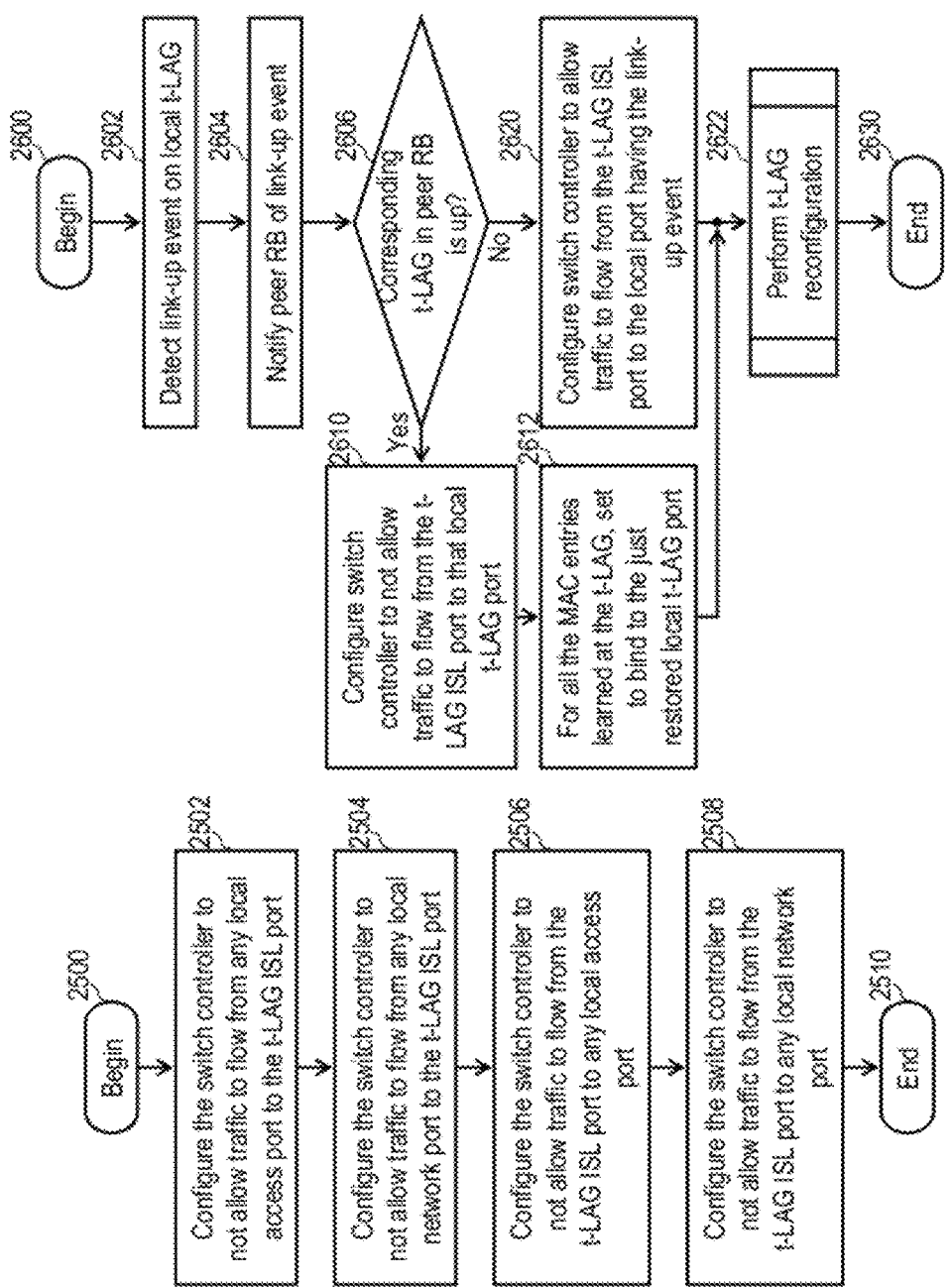

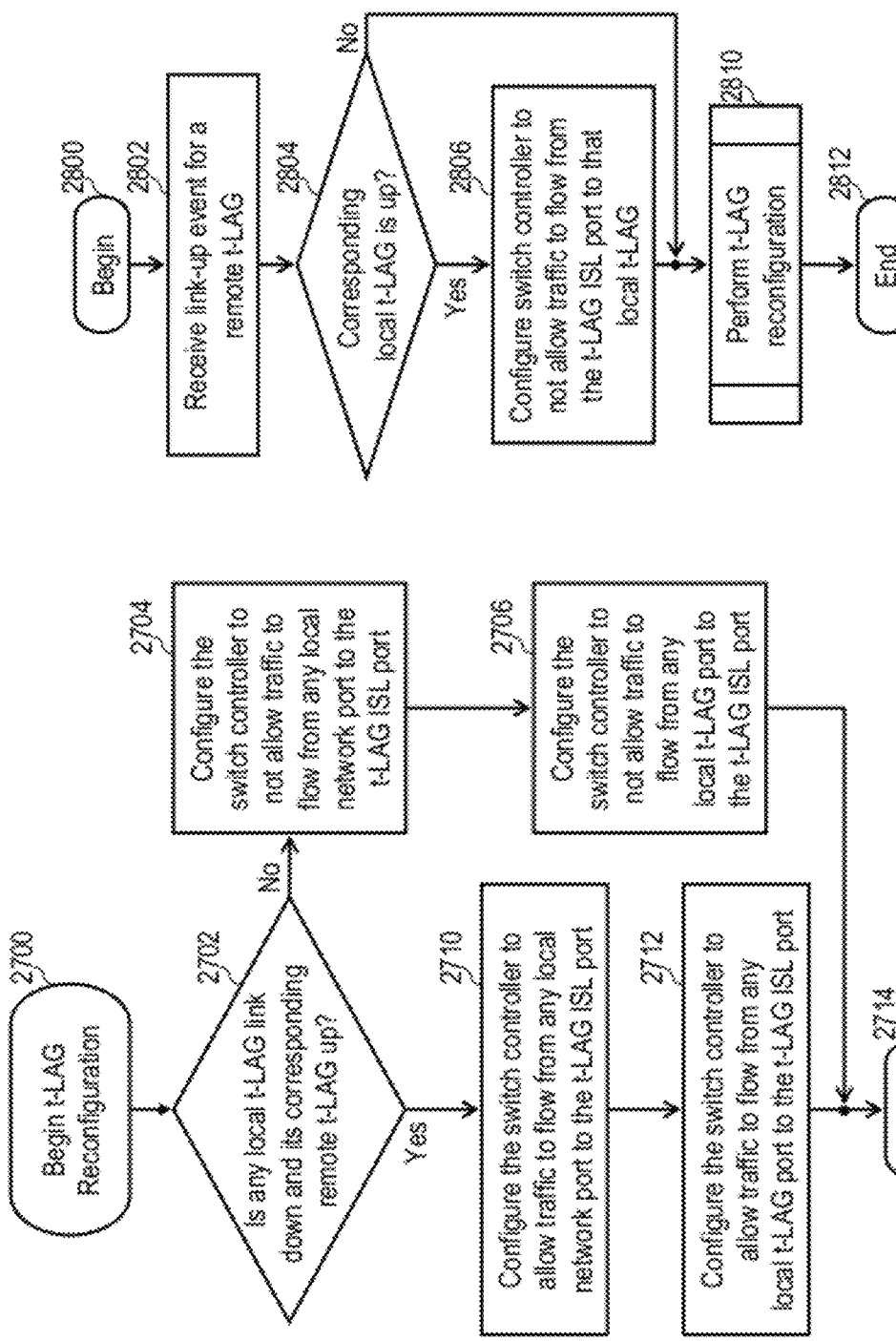

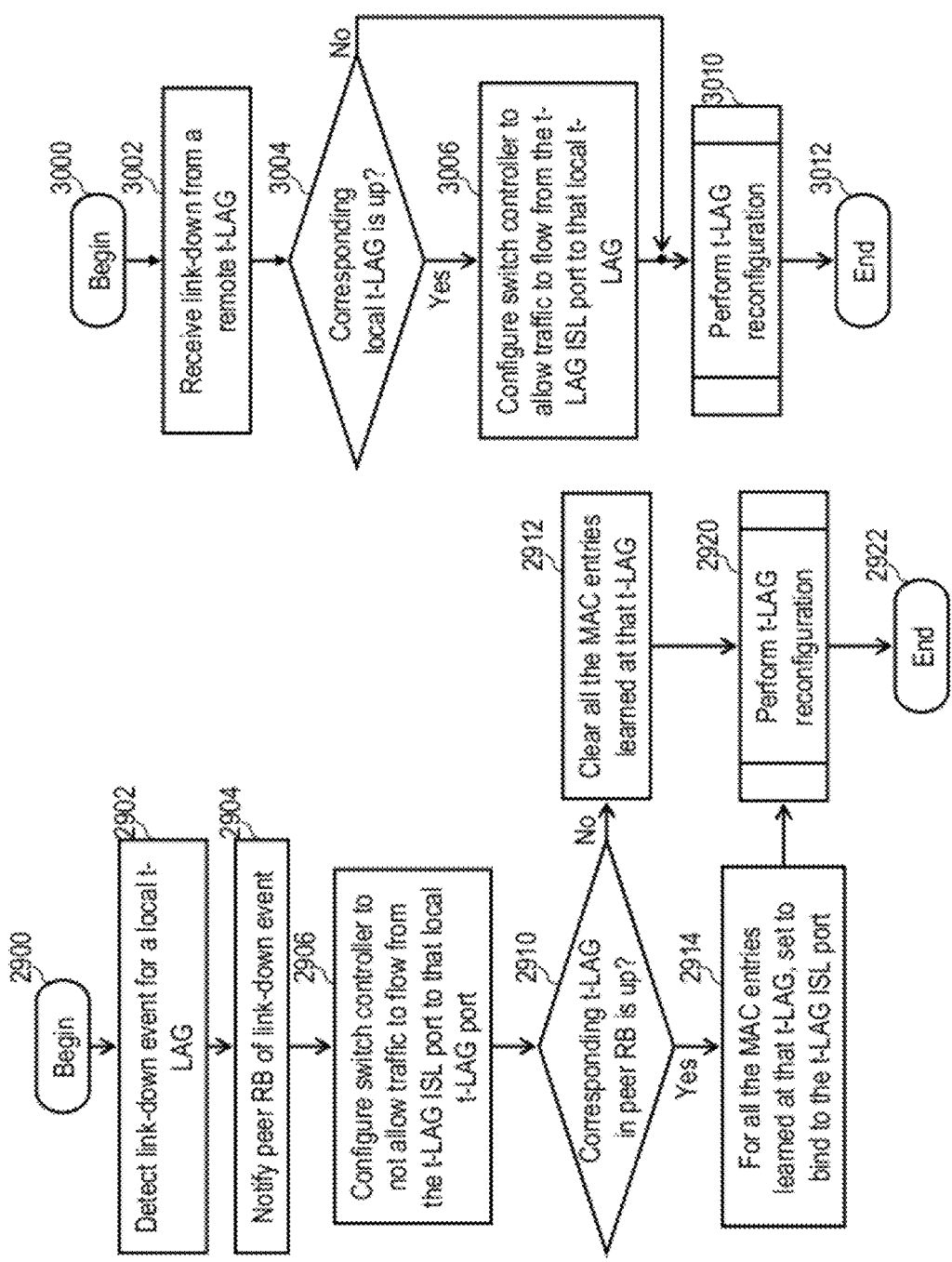

FAULT TOLERANT COMMUNICATION IN A TRILL NETWORK

PRIORITY CLAIM

The present application claims priority to U.S. Provisional Patent Application 61/498,316, filed Jun. 17, 2011.

BACKGROUND OF THE INVENTION

1. Technical Field

The present invention relates in general to data networks, and in particular, to a link aggregation group (LAG) for a Layer 2 data network, such as a Transparent Interconnection of Lots of Links (TRILL) network.

2. Description of the Related Art

The IEEE 802.1D standard defines the Spanning Tree Protocol (STP), which is a conventional data link layer protocol that ensures that a bridged Ethernet network is free of bridge loops and that a single active network path exists between any given pair of network nodes. Current trends for packet-switched data networks—including the convergence of local area network (LAN) and storage area network (SAN) traffic (e.g., Fibre Channel, Fibre Channel over Ethernet (FCoE), Internet Small Computer System Interface (iSCSI), etc.), rapidly increasing bandwidth capacities of (and demand on) network links, and increased virtualization of network resources and infrastructure—place significant additional demands on network infrastructure and management.

These demands have exposed weaknesses in STP and have generated significant industry interest in replacing STP with a more robust, efficient, and flexible Layer 2 protocol. For example, because STP permits only a single active network path between any two network nodes and blocks all alternate network paths, aggregate network bandwidth is artificially reduced and is inefficiently utilized. STP also reacts to even small topology changes and may force partitioning of virtual LANs due to network connectivity changes. In addition, the Ethernet header of STP frames does not include a hop count (or Time to Live (TTL)) field, limiting flexibility. Furthermore, because only a single active network link is supported between any two nodes, STP has poor fault tolerance, lengthy failure recovery (which can require broadcast traffic to relearn forwarding paths) and low reliability (i.e., dropped traffic).

In view of the weaknesses of STP, the Internet Engineering Task Force (IETF) has recently proposed to replace STP with a new set of Transparent Interconnection of Lots of Links (TRILL) protocols, defined, for example, in Perlman, R., et al., "RBridges: Appointed Forwarders", Internet-Draft, expires Nov. 18, 2011, and Perlman, R., et al., "RBridges: Base Protocol Specification", Internet-Draft, expires September 2010, which has been superseded by RFC6325 "RBridges: Base Protocol Specification," dated July 2011 and incorporated herein by reference. These and other TRILL protocols presuppose the use of IS-IS (as defined, for example, in IETF RFC6165) in the control plane.

With the use of TRILL protocols, regular L2 traffic is tunneled and passed via a special routing methodology (referred to herein as TRILL routing) in a TRILL campus comprising a network of RBridges and links (and possibly intervening standard L2 bridges) bounded by end stations. Multipathing is currently supported for unicast and multidestination traffic within a TRILL campus, but not on its boundary. Thus, at run time TRILL permits an external switch or server to have only one active link connected to a TRILL campus for the same Virtual LAN (VLAN).

The present application recognizes that it is desirable to promote high availability by supporting redundant links between external nodes and multiple RBridges in a TRILL campus. The present application additionally recognizes that it is also desirable to place these redundant links into a Link Aggregation Group (LAG) in order to utilize the bandwidth of all the links effectively. Accordingly, the present application discloses mechanisms and associated methodologies, referred to herein as TRILL LAG or t-LAG, that supports connection of external network nodes (e.g., switches and/or servers) to a TRILL campus via a DMLT (Distributed Multi-Link Trunk).

SUMMARY OF THE INVENTION

In at least one embodiment, each of first and second bridges of a data network having respective links to an external node implement a network bridge component that forwards traffic inside the data network and a virtual bridge component that forwards traffic outside of the data network. A virtual bridge is formed including the virtual bridge components of the first and second bridges and an interswitch link (ISL) between the virtual bridge components of the first and second bridges. Data frames are communicated with each of multiple external network nodes outside the data network via a respective one of multiple link aggregation groups all commonly supported by the virtual bridge.

In at least one embodiment, each of first and second bridges of a data network having respective external links to an external node implement a network bridge component that forwards traffic inside the network and a virtual bridge component that forwards traffic outside of the network. A virtual bridge is formed including the virtual bridge components of the first and second bridges and an interswitch link (ISL) between the virtual bridge components of the first and second bridges. Data frames are redirected via the ISL in response to a link-down condition of one of the external links.

In at least one embodiment, a switch of a data network implements both a bridge and a virtual bridge. In response to receipt of a data frame by the switch from an external link, the switch performs a lookup in a data structure using a source media access control (SMAC) address specified by the data frame. The switch determines if the external link is configured in a link aggregation group (LAG) and if the SMAC address is newly learned. In response to a determination that the external link is configured in a LAG and the SMAC address is newly learned, the switch associates the SMAC with the virtual bridge and communicates the association to a plurality of bridges in the data network.

BRIEF DESCRIPTION OF THE DRAWINGS

FIGS. 7-8 respectively illustrate more detailed view of the Forwarding Database (FDB) and RB data structures in accordance with one embodiment;

FIG. 16 is a high level logical flowchart of an exemplary process by which an egress RB of a TRILL campus performs MAC learning in response to receipt of an End Station Address Distribution Instance (ESADI) frame from another RB in accordance with one embodiment;

FIG. 17 is a high level logical flowchart of an exemplary method of configuring a RB of a TRILL campus to support a t-LAG in accordance with one embodiment;

FIG. 25 is a high level logical flowchart of an exemplary process by which a t-LAG-enabled RB is configured by default at startup in accordance with one embodiment;

FIG. 26 is a high level logical flowchart of an exemplary configuration process at a t-LAG-enabled RB in response to a local link-up event in accordance with one embodiment;

FIG. 27 is a high level logical flowchart of an exemplary t-LAG reconfiguration process in accordance with one embodiment;

FIG. 28 is a high level logical flowchart of an exemplary configuration process at a t-LAG-enabled RB in response to a remote link-up event in accordance with one embodiment;

FIG. 29 is a high level logical flowchart of an exemplary configuration process at a t-LAG-enabled RB in response to a local link-down event in accordance with one embodiment;

FIG. 30 is a high level logical flowchart of an exemplary configuration process at a t-LAG-enabled RB in response to a remote link-down event in accordance with one embodiment.

Figure 1:
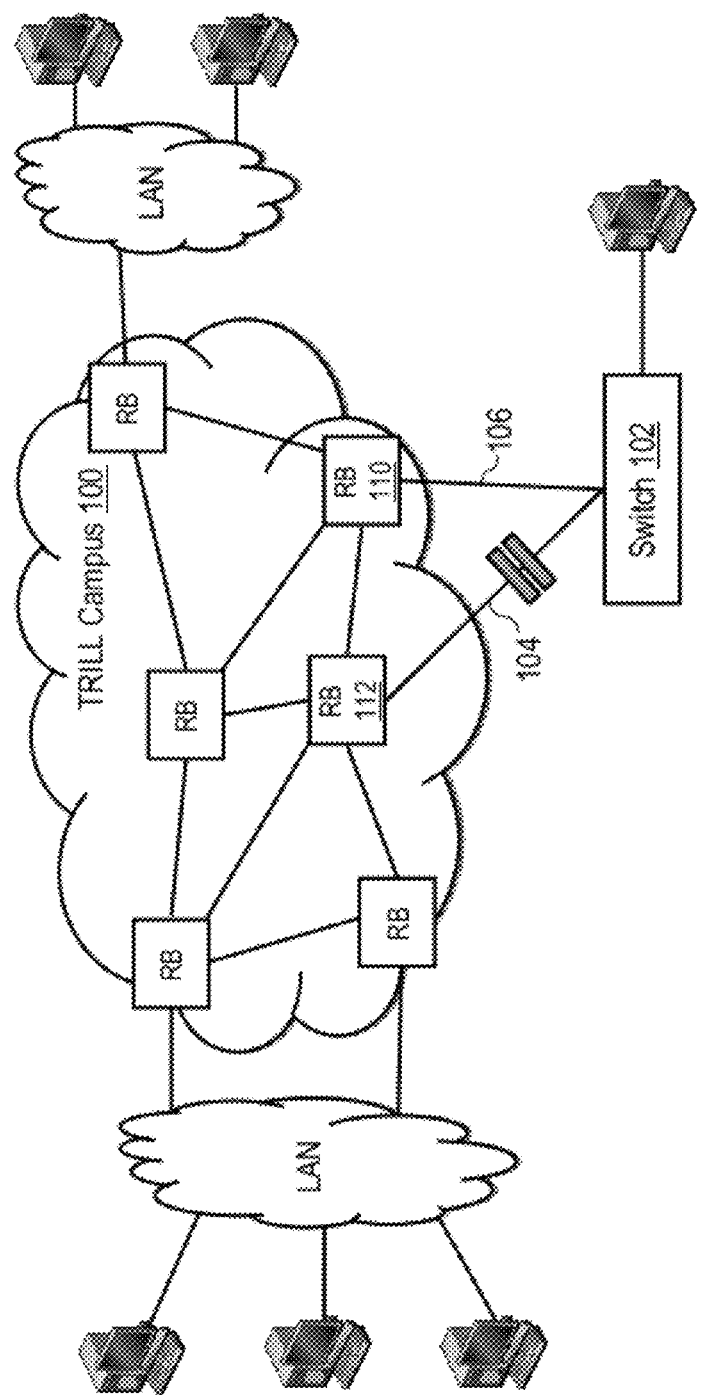
FIG. 1 is a high level block diagram of an conventional TRILL campus in accordance with the prior art.

In the drawings, common reference characters are utilized to identify like or corresponding features.

DETAILED DESCRIPTION OF ILLUSTRATIVE EMBODIMENT

The present application describes mechanisms and associated methodologies, referred to herein as TRILL LAG or t-LAG, that facilitate the connection of network nodes (e.g., servers and/or switches) external to a TRILL campus in a Link Aggregation Group (LAG) through the use of a virtual routing bridge (virtual-RB). Multiple t-LAGs may additionally be hosted by a set of multiple physical switches, herein referred to as a t-LAG cluster, with all t-LAGs in a given t-LAG cluster preferably (but not necessarily) sharing the same virtual-RB. The use of the virtual-RB for the t-LAGs can resolve load distribution for unicast (UC) traffic. For multidestination (e.g., multicast (MC), broadcast (BC), destination lookup fail (DLF)) traffic, different mechanisms are employed to ensure traffic is properly delivered to a peer RB of a t-LAG cluster; otherwise, either more than one copy of a multidestination frame may be sent to the same destination or a frame may be erroneously returned to an external network node that sourced the frame via the same t-LAG at which the frame ingressed the TRILL campus.

It is presently preferred to separate the traffic forwarding in a t-LAG cluster into two domains: the TRILL routing domain and the regular L2 switching domain. That is, it is preferred if the data switching in the regular L2 domain in a t-LAG cluster is handled within the virtual-RB itself and does not go through TRILL routing at all, if possible. An interswitch link (ISL) for a t-LAG cluster can advantageously be used for frame redirection in the regular L2 switching domain in the event of a link failure on any t-LAG in the t-LAG cluster.

With reference now to the figures and with particular reference to FIG. 1, there is illustrated a high level block diagram of an conventional TRILL campus 100 in accordance with the prior art. Prior art TRILL campus 100 includes a packet-switched data network including plurality of Rbridges (RBs) interconnected by network links. As shown, various of the RBs are coupled to external LANs and/or network nodes, such as switch 102.

The present TRILL protocols permit multi-paths within TRILL campus 100, but not at its boundary. Consequently, if an external network node, such as switch 102, wants to connect to a TRILL campus by multiple physical links, such as links 104 and 106, the TRILL protocols will determine an appointed forwarder for each VLAN running on top of the links and, as a result, will utilize only a single link for data forwarding at run time for each VLAN. Accordingly, for a given VLAN, traffic between switch 102 and RB 112 on link 104 is blocked (as shown) if RB 110 is chosen as the appointed forwarder for that VLAN. Consequently, all traffic for that VLAN will be forwarded from TRILL campus 100 to switch 102 via link 106.

Figure 2:
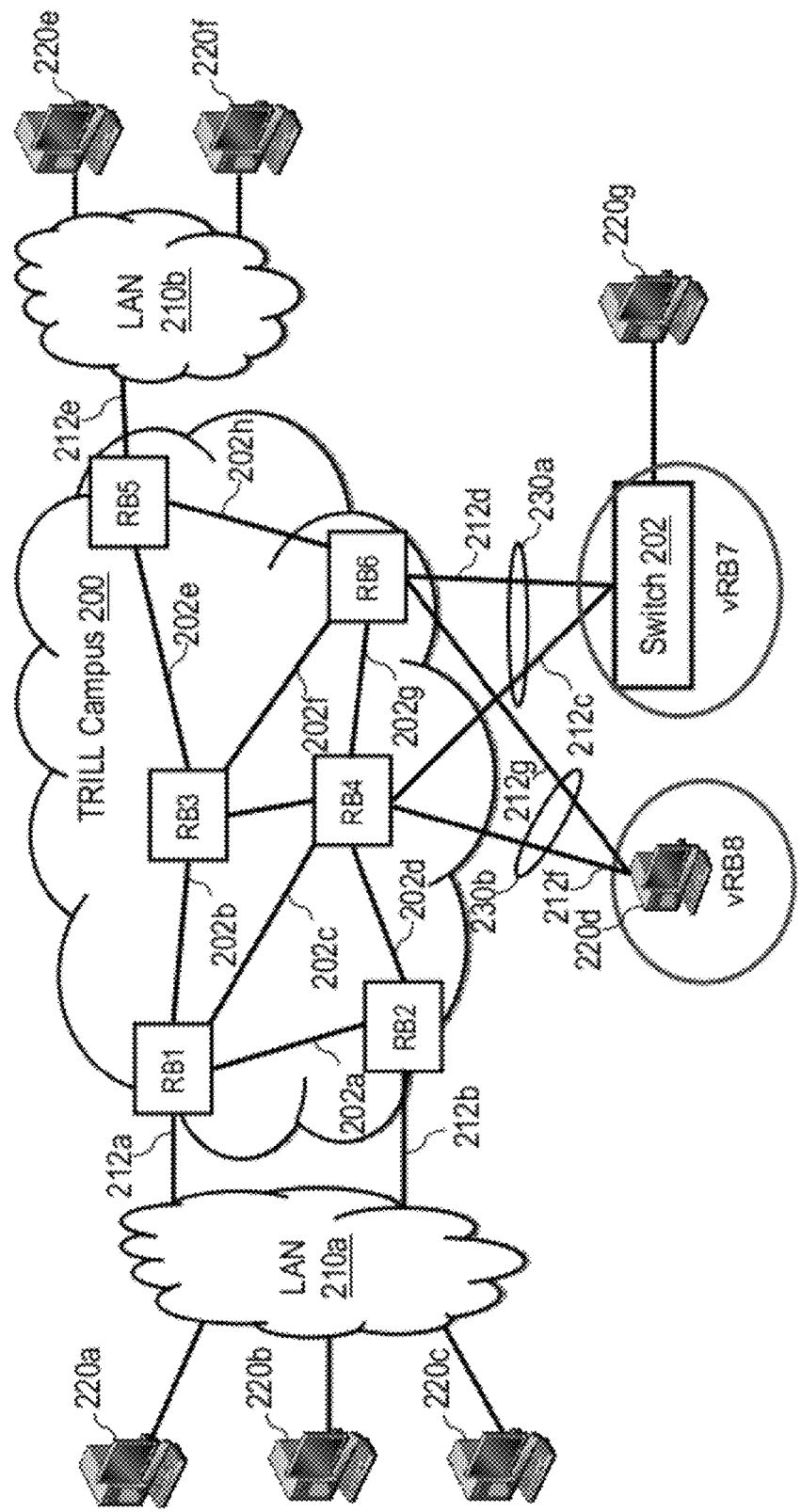
FIG. 2 depicts an exemplary network environment in which a network node external to a TRILL campus can be connected to multiple RBridges (RBs) in the TRILL campus via multiple redundant links forming a LAG.

Referring now to FIG. 2, an exemplary network environment in which a network node external to a TRILL campus 200 can be connected to multiple RBs in the TRILL campus via multiple redundant links forming a LAG. The exemplary network environment includes a TRILL campus 200 comprising a packet-switched data network including a plurality of RBs (e.g., RB1-RB6) coupled by internal network links 202a-202h. Various of RB1 through RB6 are connected by external links to external networks or external nodes. For example, RB1 and RB2 connect to an external LAN 210a supporting end stations 220a-220c by external links 212a and 212b, respectively. Similarly, RB5 connects to an external LAN 210b, which supports ends stations 220e-220f, by an external link 212e. Further, RB4 and RB6 connect to an external switch 202, which supports end station 220g, by external links 212c and 212d, respectively, and RB4 and RB6 further connect to an end station 220d by external links 212f and 212g. As further shown, external links 212c and 212d form t-LAG 230a, and external links 212f and 212g form t-LAG 230b.

In at least one embodiment, for TRILL campus 200 to support t-LAGs to external nodes (e.g., t-LAGs 230a and 230b), an additional RBridge, referred to as a virtual-RB or vRB herein, is created and deployed for each t-LAG. Thus, for example, vRB7 running on top of RB4 and RB6 supports t-LAG 230a, and vRB8 running on top of RB4 and RB6 supports t-LAG 230b. All the virtual-RBs in a TRILL campus created for the same t-LAG preferably employ the same RB nickname, which, as known to those skilled in the art, is utilized to identify an ingress RB in the TRILL tunneling header encapsulating an Ethernet frame. Further details regarding the TRILL header as described below with reference to FIG. 10.

All the virtual-RBs supporting t-LAGs are preferably involved in the TRILL IS-IS communication in active-active mode, as well as End Station Address Distribution Instance (ESADI) communication. For ESADI communication, each t-LAG-enabled switch preferably handles all the MAC addresses learned at its local t-LAG ports. A t-LAG-enabled RB preferably conducts this communication on behalf of the virtual-RB(s) running on top of it, if any. In addition, a LSP (Link State PDU (Protocol Data Unit)) is preferably generated automatically by a local switch for each virtual-RB on it. Shortest path first (SPF) computation preferably also takes these virtual-RBs into account, at least for UC traffic.

Figure 4:
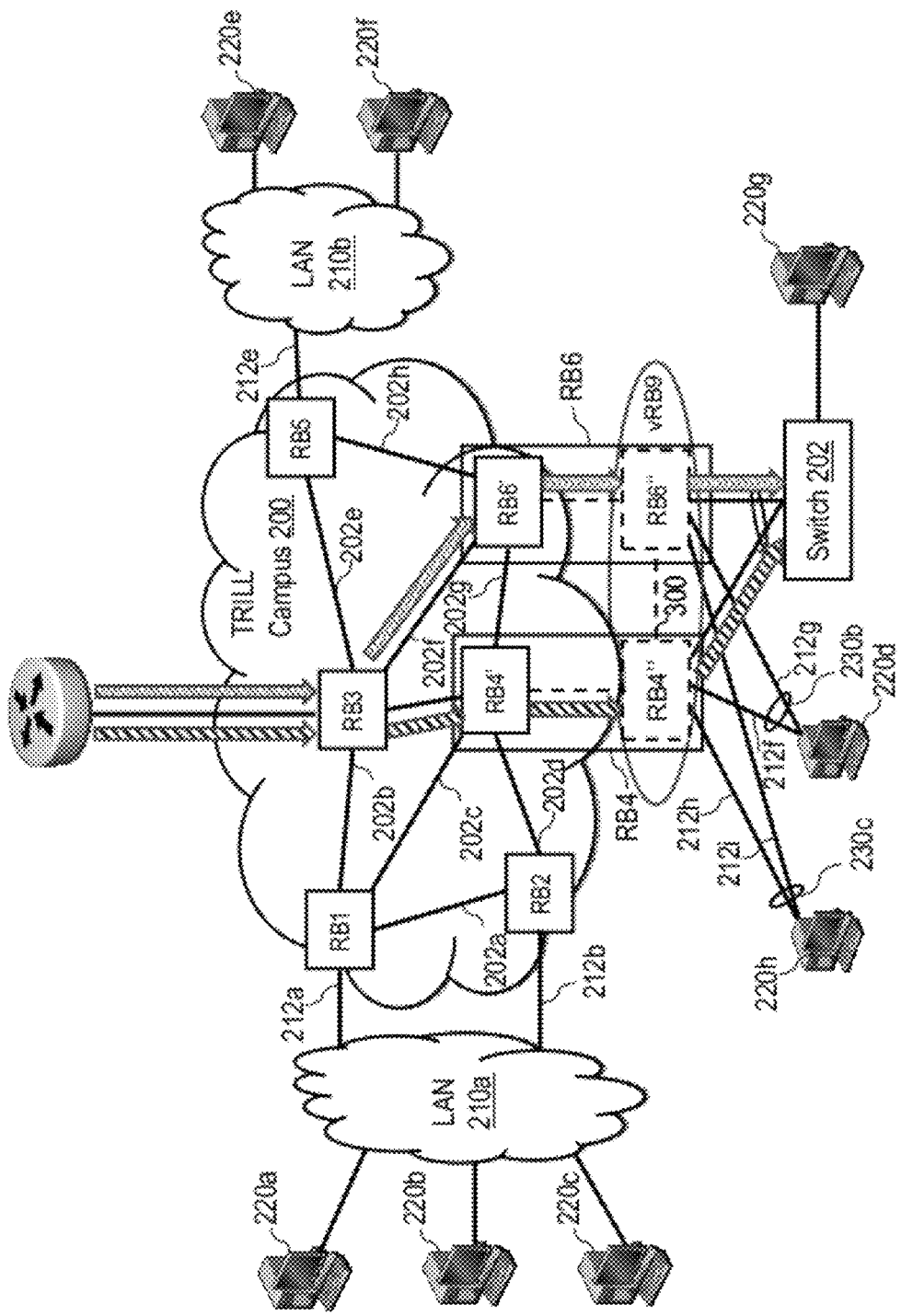
FIG. 4 depicts an exemplary network environment in which unicast traffic is autonomously distributed across the links of a t-LAG.

As further shown in FIG. 2, the switch chip(s) providing the switching intelligence of RB1 through RB6 in TRILL campus 200 preferably have the capability of contemporaneously handling traffic for more than one RB. For example, in the depicted embodiment, RB4 handles ingress and egress traffic for RB4 (the switch itself), as well as vRB7 and vRB8; RB6 similarly handles ingress and egress traffic for itself (i.e., RB6), as well as vRB7 and vRB8. To support this capability, for traffic ingressing at a t-LAG, the edge RBs (i.e., those connected to at least one external link 212) within TRILL campus 200 are preferably able to employ the corresponding ingress virtual-RB nickname as the ingress RB for TRILL encapsulation of the frames. For example, the traffic ingressing at RB4 may use RB4, vRB7 or vRB8 as the ingress RB in the TRILL header, depending upon which local port the frame is ingressing on. Similarly, the traffic ingressing at RB6 may use RB6, vRB7 or vRB8 as the ingress RB, again depending on the local port the frame is ingressing on. In this way, when a frame exits TRILL campus 200, the MAC learning performed at egress RBs will automatically bind the client source Media Access Control (SMAC) address to the ingress virtual-RB. Once this binding is established, UC traffic destined for a t-LAG will be autonomously load balanced across the external links comprising the t-LAG, as shown in FIG. 4. This use of the ingress virtual-RB as the ingress RB in TRILL headers may, however, cause problems for multidestination traffic traversing inside a TRILL campus, as discussed below.

In some cases, switch chips may not be capable of contemporaneously handling TRILL data frames for more than one RB or may support only a limited number of RBs (i.e., fewer than the number of RBs deployed). In addition, the number of distribution trees supported on a switch chip can also be very limited. Due to these factors, some adjustments may be required to adapt to such switching hardware limitations.

Figure 3:
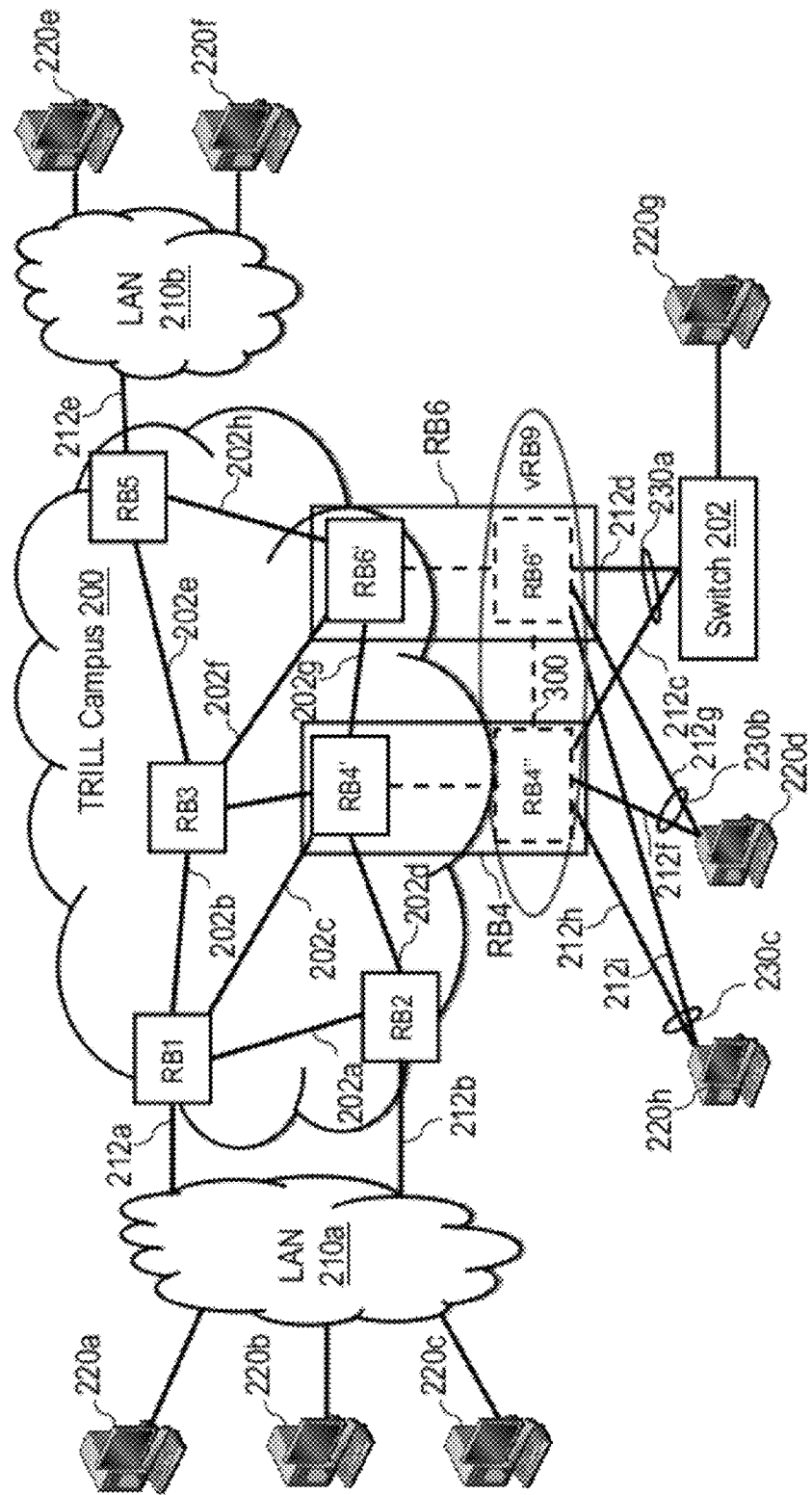
FIG. 3 illustrates an exemplary network environment in which a TRILL RB handles ingress and egress traffic for multiple RBs coupled to a TRILL campus via t-LAGs.

With reference now to FIG. 3, there is illustrated a high level view of a network environment in which multiple t-LAGs supported by a TRILL campus form a t-LAG cluster. As seen by comparison of FIGS. 2 and 3, FIG. 3 depicts a similar network environment as that described above with reference FIG. 2 with a couple of differences.

First, the network environment of FIG. 3 includes an additional end station 220h, which is coupled to RB4 and RB6 via an additional t-LAG 230c including external links 212h and 212i. Second, t-LAGs 230a-230c, which all belong to the same t-LAG cluster, are supported by a single virtual-RB (i.e., vRB9) rather than two virtual RBs (i.e., vRB7 and vRB8) and thus can share one RB nickname, if desired. As a result, the total number of RBs used in TRILL campus 200 will be reduced as compared to embodiments in which one virtual-RB is implemented per t-LAG. It should be noted that it is possible for a t-LAG cluster to use more than one RB nickname if desired, meaning, for example, the assignment of a virtual-RB to a t-LAG can be t-LAG-based.

Second, FIG. 3 further depicts that RB4 and RB6 are each comprised of two components: an intra-campus RB component (RB4' and RB6') designated to handle traffic forwarding inside the TRILL campus 200 and an extra-campus RB component (RB4" and RB6") designated to handle the traffic forwarding outside of TRILL campus 200 (i.e., in the regular L2 switching domain). As shown, the virtual-RB supporting the t-LAG cluster (i.e., vRB9) is formed of extra-campus RB components RB4" and RB6" linked by a t-LAG ISL 300 and thus may be distributed across multiple physical switch platforms. T-LAG ISL 300 is utilized for control communication and for failure handling. For example, t-LAG ISL 300 can be utilized for frame redirection in the event of a link failure on any local t-LAG port, as discussed further herein with reference to FIGS. 19-30.

For frames ingressing into TRILL campus 200, vRB9 passes the frame either to RB4' or to RB6' based upon whether the frame was received at RB4" or RB6", respectively. As noted in FIG. 3, for traffic that needs to pass beyond TRILL campus 200, RB4" is only connected to RB4', and RB6" is only connected to RB6'. The virtual links connecting RB4' to RB4" and RB6' to RB6" are zero cost and should be handled transparently by the switch chips on RB4 and RB6, respectively. It is recommended but not required that the handling of all local L2 switching in a virtual-RB (e.g., vRB9) should be handled locally within the RB itself.

As with all network links, a link in a t-LAG may go down at run time. Consequently, it is desirable to handle such link failures in a manner that minimizes or reduces frame loss. At least two techniques of failure handling are possible:

1. To adjust the connectivity between the intra-campus RB (e.g., RB4' in FIG. 3) and its virtual-RBs (e.g., RB4" or vRB9) at run time; and/or 2. To use the t-LAG ISL (e.g., ISL 300 between RB4" and RB6" in FIG. 3) for frame redirection whenever a link failure occurs in the t-LAG cluster.

With the first solution, if a t-LAG link drops on a switch (e.g., RB4"), the virtual link between the intra-campus RB component (e.g., RB4') and the virtual-RB (e.g., RB4" or, actually, vRB9) will be claimed link-down. In this way, after the topology change has been communicated to all the RBs and a new path has taken effect, the UC traffic previously routed to RB4 will be routed to RB6 for egress via a t-LAG link in RB6". For multidestination (MC/BC/DLF) traffic, the local access ports on edge RBs (those like RB4" and RB6" that interface with external links 212a-212i) will need to be adjusted at run time to allow the traffic be delivered via a healthy link in RB6" for the same t-LAG. With the second solution, the t-LAG ISL (e.g., ISL 300) is used to redirect UC or multidestination frames to the peer RB in the same t-LAG cluster in case a t-LAG port on the local RB has a link down.

Because more than one t-LAG shares the same virtual link in the first solution (e.g., the virtual link from RB4' to RB4" in FIG. 3), all other healthy t-LAG links on that RB (e.g., RB4") will not be used for UC frame delivery once the connectivity between RB4' and RB4" is claimed link-down. Thus, some bandwidth of healthy t-LAG links can be wasted in this case. In the second solution, the t-LAG ISL (e.g., ISL 300) may get over-loaded if too much traffic needs to pass through it. It is therefore presently preferred if both the first and second solutions are implemented in order to better address link failures on t-LAGs. In this combined solution, a threshold is preferably implemented and pre-specified so that a t-LAG-enabled switch can stop claiming the connectivity between the switch RB (e.g., RB4) and the virtual-RB (e.g., vRB9) if the number of the local t-LAG ports that are link-down exceeds the threshold. It should be noted that it will take time for related TRILL IS-IS communication as well as SPF computation to occur and complete before a new topology path can be applied in response to a t-LAG link-down event. Before these complete, all the traffic directed to a failed t-LAG link should be redirected as soon as possible via the t-LAG ISL to the peer RB for delivery to external network nodes (e.g., switches or servers).

In TRILL, multidestination traffic (MC/BC/DLF) is handled differently from UC traffic. A distribution tree is predetermined and followed for a specific flow of multidestination traffic ingressing a TRILL campus at an RB. Usually, all RBs in TRILL campus will be visited in all the distribution trees unless a VLAN or pruning has been applied to the distribution tree. Unless some provision is made, more than one copy of a frame will (undesirably) be delivered to external switches or servers via a t-LAG, if the frame is flooded in the TRILL campus following a distribution tree and all RBridges transmit the frame out of their local access ports.

To prevent delivery of duplicate frames, a primary link for each t-LAG is preferably predetermined and followed for a specific multidestination (MC/BC/DLF) traffic flow egressing from a TRILL campus. Several methodologies are possible for selecting the primary link for a t-LAG, including:

System-based: The same link in a t-LAG is always used across a TRILL campus as the primary link for multidestination transmission, if the link is available.

Distribution tree-based: Different distribution trees can use different t-LAG links as the primary link for multidestination transmission.

(Distribution tree, VLAN)-based: Different t-LAG links can be used as the primary link for different VLANs in a distribution tree.

(Distribution tree, VLAN, DMAC)-based: Different t-LAG links can be used as the primary link for different destination MAC (DMAC) addresses for the same distribution tree and the same VLAN.

As will be appreciated, the pre-determined selection of the primary link for a t-LAG may need to be adjusted at run time if a link-down event occurs in a t-LAG. Accordingly, the RBs in a t-LAG cluster preferably inter-communicate link-up and link-down event notifications. Before any required adjustment in the predetermined selection of the primary link is implemented in response to a link-down event, the t-LAG ISL (e.g., t-LAG ISL 300) can be used for frame redirection to avoid frame drop due to frames being sent to a failed primary t-LAG link.

Figure 5:
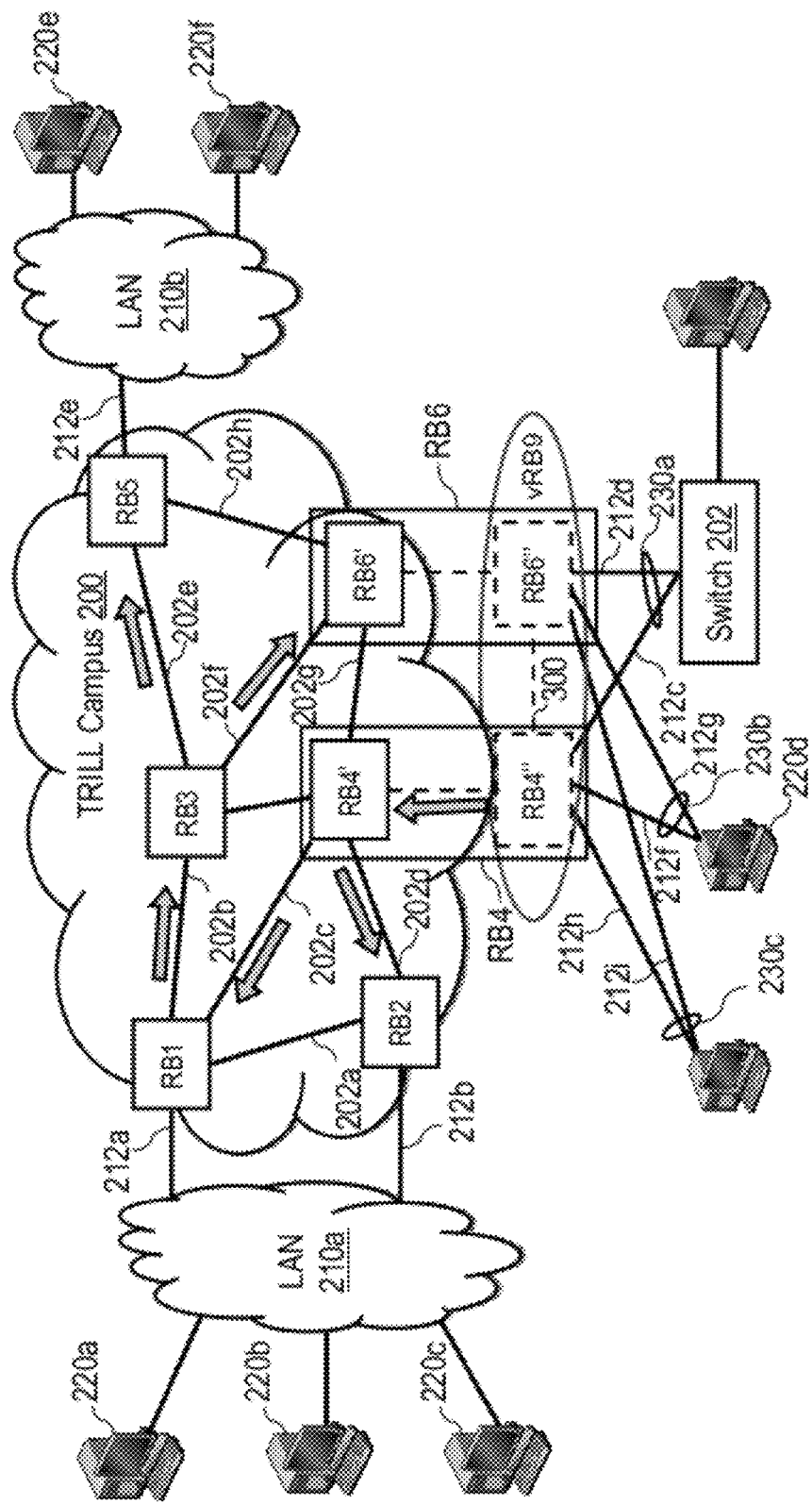
FIG. 5 illustrates an exemplary network environment in which the use of the ingress virtual-RB as the source RB in TRILL encapsulation of frames may cause problems in distribution of multidestination traffic in the TRILL campus.

It is important to the t-LAG design to bind a client SMAC to the ingress virtual-RB for a t-LAG. It would also be beneficial if the ingress virtual-RB can be used as the ingress RB in TRILL encapsulation for a frame when it enters at a t-LAG, as the MAC learning performed at egress RBs will do this binding automatically. However, the use of the ingress virtual-RB as the ingress RB in TRILL encapsulation of frames may cause problems in distribution of multidestination traffic in the TRILL campus for some switch chips, as now described with reference to FIG. 5.

Assuming the illustrated distribution tree rooted at vRB9 is used for a multidestination flow and the link between RB4' and RB4" is chosen as part of the distribution tree, if a data frame ingresses into the TRILL campus via a t-LAG in RB6", the data frame may get dropped as it traverses in TRILL campus 200 (e.g., by RB1 or RB3) because vRB9 is used as the ingress RB in the TRILL header of the frame, but is actually on the destination side of the distribution tree. Instead of using the virtual-RB (e.g., vRB9) as the source, the switch RB (e.g., RB6) should be used as the source RB in TRILL encapsulation in the above case in order to prevent erroneous frame dropping. This ingress RB designation should be applied to both UC and multidestination traffic to avoid MAC flapping at egress RBs.

As mentioned, one aspect of the implementation of t-LAG is the binding of the client SMAC learned at a t-LAG to the virtual-RB created for that t-LAG. If the virtual-RB (e.g., vRB9) can be used as the ingress RB in TRILL encapsulation, then the desired binding can be automatically achieved (e.g., by hardware) via the MAC learning performed at egress RBs. If the switch RB (e.g., RB6) is instead used as the ingress RB for TRILL encapsulation to avoid erroneous frame dropping of multidestination traffic as discussed above, then a different technique must be employed to achieve the desired binding of the client SMAC to the virtual-RB.

Figure 15:
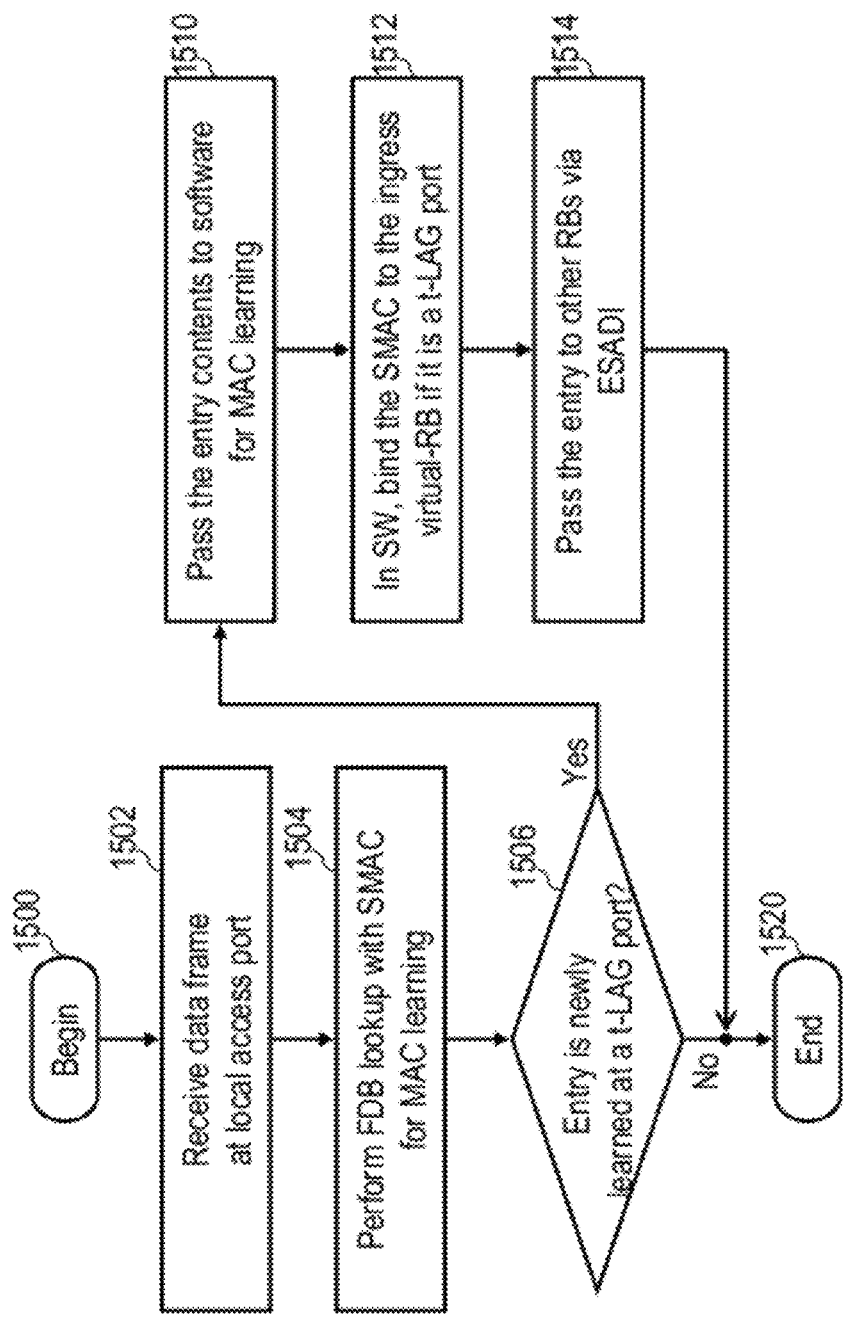
FIG. 15 is a high level logical flowchart of an exemplary process by which an ingress RB of a TRILL campus performs MAC learning at a t-LAG port in accordance with one embodiment.

One alternative technique to achieve the desired binding of the client SMAC to the virtual-RB is through software-based MAC learning performed on a t-LAG-enabled switch (as described, for example, with reference to FIG. 15). A MAC address learned at a t-LAG port can be specially manipulated in software to bind to ingress virtual-RB; this newly learned MAC entry can then be propagated via ESADI to all other RBs in the TRILL campus for configuration. In this way, the load distribution of UC traffic at any ingress RB can then be achieved automatically. It is also possible to perform the MAC learning via hardware at egress RBs if the chips of the relevant switches allow multiple RBs be mapped into the same virtual port so that the MAC learning performed on the chips can bind a client SMAC to the corresponding ingress virtual-RB.

Filtering Database for Bridge (FDB) sync for SMACs learned at t-LAG ports is preferably implemented between the peer RBs in a t-LAG cluster, especially if the LAG hashing algorithm performed on external switches or servers is SMAC-based. This FDB synchronization avoids unnecessary flooding or dropping of known UC traffic at egress to a t-LAG if the egress RB has no related MAC information. The MAC information of the peer RB in the same cluster is also needed upon making a decision to redirect traffic to the t-LAG ISL when a local t-LAG link fails.

Because all RBs in a TRILL campus will usually be part of a distribution tree, it is possible that a data frame may attempt to return to the t-LAG at which it ingresses, for example, through a link for the same t-LAG but on a different RB than the ingress RB. Actions, such as the enforcement of ACLs, can be applied on all the t-LAG-enabled RBs to ensure that such looping data frames are dropped before egressing from TRILL campus 200, as described further below with reference to FIG. 14.

Figure 6:
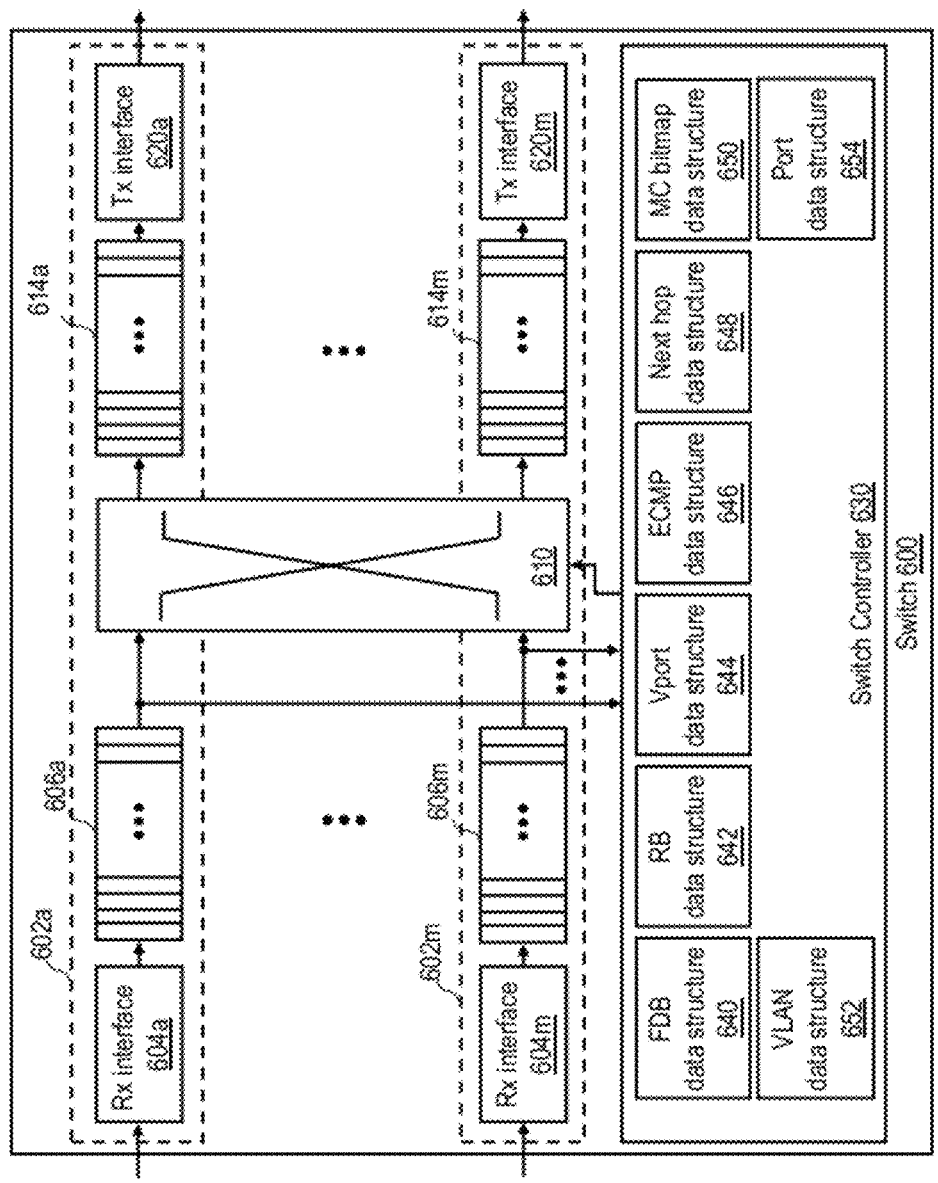
FIG. 6 depicts an exemplary switch, which can be utilized to implement a TRILL RB (or vRB) in accordance with one or more embodiments.

With reference now to FIG. 6, there is illustrated an exemplary embodiment of a physical switch 600 that may be utilized to implement any of the RBs or vRBs of TRILL campus 200, as depicted in FIG. 2 or FIG. 3. As shown, switch 600 includes a plurality of physical ports 602a-602m. Each physical port 602 includes a respective one of a plurality of receive (Rx) interfaces 604a-604m and a respective one of a plurality of ingress queues 606a-606m that buffers frames of data traffic received by the associated Rx interface 604. Each of ports 602a-602m further includes a respective one of a plurality of egress queues 614a-614m and a respective one of a plurality of transmit (Tx) interfaces 620a-620m that transmit frames of data traffic from an associated egress queue 614. Ports 602 connected to external links 212 are referred to herein as "local access ports," while ports 602 connected to internal links 202 of TRILL campus 200 are referred to herein as "local network ports."

Switch 600 additionally includes a switch fabric 610, such as a crossbar or shared memory switch fabric, which is operable to intelligently switch data frames from any of ingress queues 606a-606m to any of egress queues 614a-614m under the direction of switch controller 630. As will be appreciated, switch controller 630 can be implemented with one or more centralized or distributed, special-purpose or general-purpose processing elements or logic devices (also referred to as "switch chips"), which may implement control entirely in hardware, or more commonly, through the execution of firmware and/or software by a processing element. Switch controller 630 thus provides the switching intelligence that implements the RB (and vRB) behavior herein described.

In support of the RB and vRB behavior described herein, switch controller 630 implements a number of data structures in volatile or non-volatile data storage, such as cache, memory or disk storage. Although these data structures are commonly referred to as "tables," those skilled in the art will appreciate that a variety of physical data structures including, without limitation, arrays, lists, trees, or composites thereof, etc. may be utilized to implement various ones of the data structures.

The depicted data structures include FDB data structure 640, which as illustrated in FIG. 7, includes multiple entries each including fields for specifying an RB (or vRB), a virtual local area network (VLAN) identifier (VID), a destination media access control (DMAC) address, and a destination port (i.e., either a local access port (lport) or virtual port (vport) on a remote RB). For L2 switching; based on a (DMAC, VLAN) tuple, FDB data structure 640 returns the destination port of the frame, which can be a local access port, a vport for a remote RB (for UC traffic), or a vport for a distribution tree (for multidestination traffic). For TRILL multidestination traffic, FDB data structure 640, responsive to an input (RB, VLAN) or (RB, DMAC, VLAN) tuple, returns a vport for a distribution tree for the multidestination traffic.

The data structures of switch controller 630 additionally includes RB data structure 642, which, as depicted in FIG. 8, includes multiple entries each including fields for specifying an RB (or vRB) and a destination port (i.e., an lport or a vport). For TRILL routing, RB data structure 642, responsive to an indication of the egress RB of a data frame, returns a destination port for sending out data traffic, where the destination port can be a local access port or a vport for a remote RB. Based on the specification of an ingress RB, RB data structure 642 additionally provides the vport for MAC learning at an egress RB. For TRILL multidestination traffic, RB data structure 642 provides the vport for a distribution tree based on the root RB.

The data structures employed by switch controller 630 further include:

Vport data structure 642: for UC traffic, given a vport, vport data structure 642 returns the egress RB and an index to next hop data structure 648 (if Equal-Cost Multi-Path routing (ECMP) is disabled) or an index to ECMP data structure 646 (if ECMP is enabled); for multidestination traffic, vport data structure 642 returns the root RB (or vRB) of the distribution tree plus an index to MC bitmap data structure 650;

ECMP data structure 646: given an index, ECMP data structure 646 resolves the index to a next hop for TRILL routing;

Next hop data structure 648: for a given traffic flow, next hop data structure 648 indicates the local port for egress, the next-hop DMAC, and the SMAC and VLAN to use for forwarding;

MC bitmap data structure 650: given an index, MC bitmap data structure 650 returns both a Layer 2 (L2) and a Layer 3 (L3) bitmap; the L2 bitmap is used for flooding to local access ports, and the L3 bitmap is used for tree distribution inside the TRILL campus, where a bit turned on in L3 bitmap can be used in port data structure 654 to index into next hop data structure 648;

VLAN data structure 652: VLAN data structure 652 contains a vport for a distribution tree for BC/DLF flooding;

Port data structure 654: for each local port 602, port data structure 654 contains an index to next hop data structure 648 to support TRILL distribution trees and further indicates the ingress RB to use for multidestination traffic flows.

Figure 9:
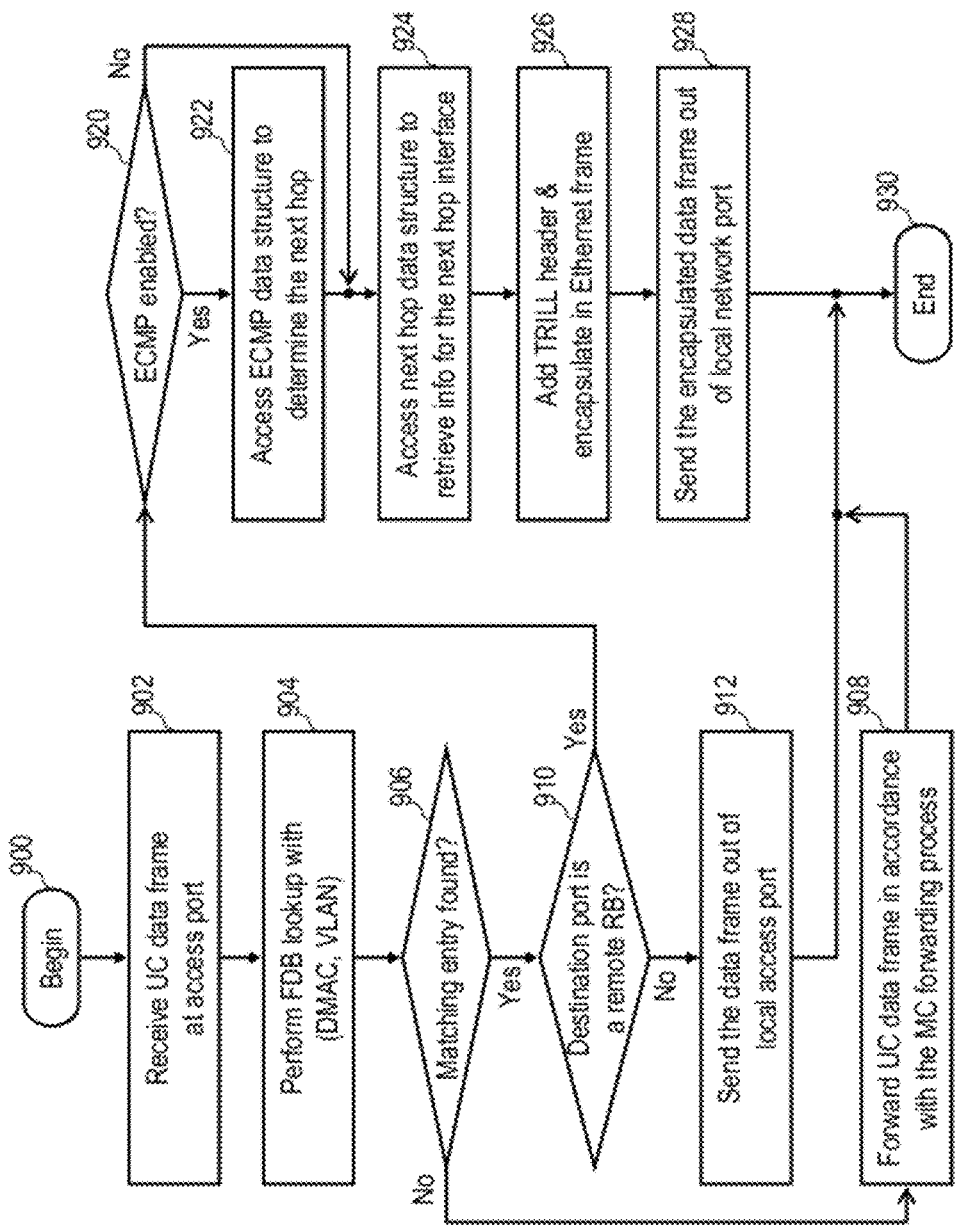
FIG. 9 is a high level logical flowchart of an exemplary process by which an edge RB (or vRB) of a TRILL campus implements forwarding for UC traffic ingressing the TRILL campus in accordance with one embodiment.

With reference now to FIG. 9, there is illustrated a high level logical flowchart of an exemplary process by which an edge RB (or vRB) of TRILL campus 200 implements forwarding for UC traffic ingressing TRILL campus 200 in accordance with one embodiment. The process begins at block 900 and then proceeds to block 902, which depicts an edge RB of TRILL campus 200 receiving a UC data frame at an access port (e.g., a port 602 connected to one of external links 212a-212i). In response to receipt of the UC data frame, the edge RB performs a lookup in FDB data structure 640 based on a tuple including the DMAC and VLAN specified in the data frame. As indicated at block 906, if no matching entry for the data frame is found in FDB data structure 640, the edge RB forwards the UC data frame in accordance with the MC forwarding process depicted in FIG. 11, which is described below. Thereafter, the UC forwarding process depicted in FIG. 9 ends at block 930.

Returning to block 906, in response to finding a matching entry for the (DMAC, VLAN) tuple in FDB data structure 640, the edge RB determines at block 910 if the destination port indicated by FDB data structure 640 is a vport for a remote RB. If not, the edge RB sends the data frame out of the local access port indicated by FDB data structure 640 (i.e., performs regular L2 forwarding on an external link 212 outside of TRILL campus 200) as shown at block 912, and the UC forwarding process of FIG. 9 ends at bock 930. If, however, the edge RB determines at block 910 that the destination port specified by FDB data structure 640 is a vport for a remote RB, the edge RB, which will serve as the ingress RB, further determines whether ECMP is enabled (block 920). If not, the process proceeds to block 924, described below. If ECMP is enabled, the edge RB accesses ECMP data structure 646 to determine the next hop for the data frame (block 922). Following either block 920 (if ECMP is disabled) or block 922 (if ECMP is enabled), the edge RB accesses next hop data structure 648 to retrieve information for the next hop interface (block 924). Thereafter, the edge RB adds a TRILL header and an outer encapsulating Ethernet header to the data frame (block 926) and sends the encapsulated data frame out of a local network port on an internal link 202 of TRILL campus 200 to the next hop (block 928). Thereafter, the UC forwarding process terminates at block 930.

Figure 10:
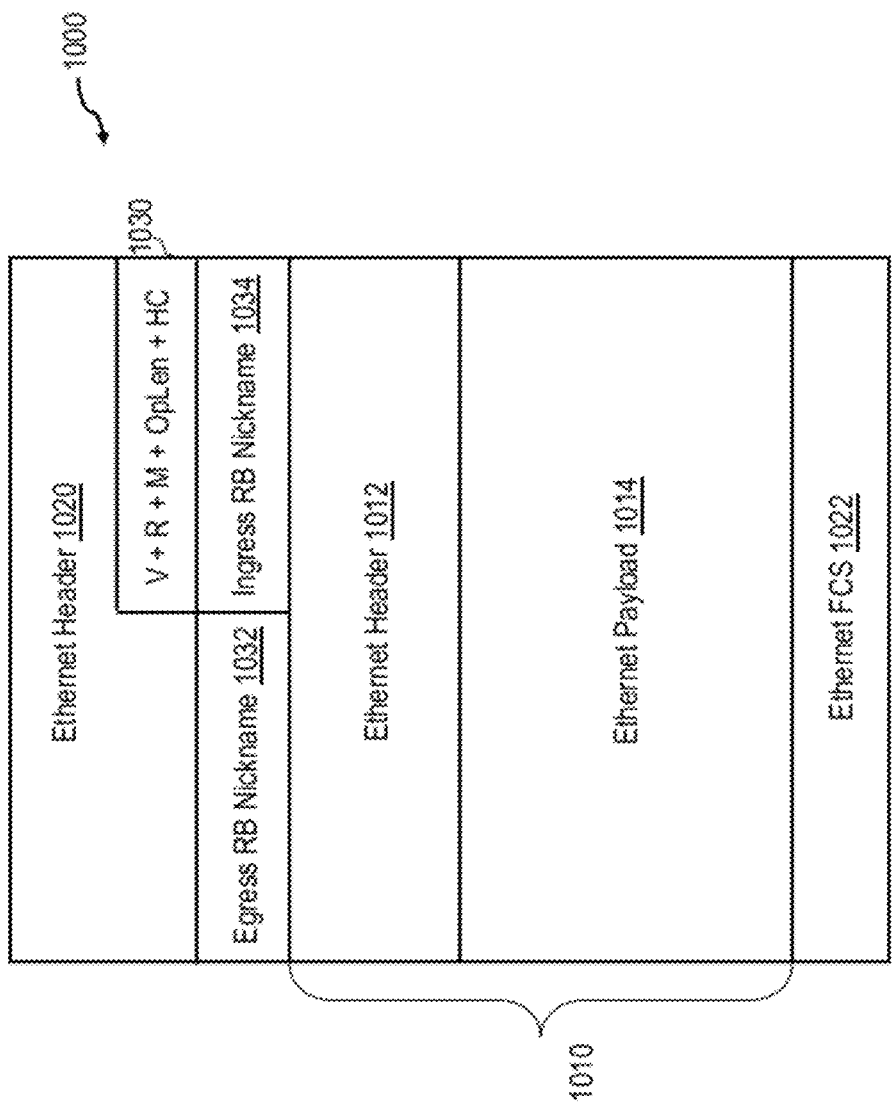
FIG. 10 depicts an exemplary embodiment of a TRILL data frame including a native Ethernet frame is augmented with a TRILL header and an outer Ethernet header.

Referring to FIG. 10, there is depicted an exemplary embodiment of a TRILL data frame 1000 in accordance with one embodiment. As received at an edge RB (e.g., at block 902 of FIG. 9), a conventional (native) Ethernet data frame 1010 includes a Ethernet header 1012 and an Ethernet payload 1014. As described at block 926 of FIG. 9, the edge RB prepends a TRILL header to Ethernet frame 1010 and then encapsulates the whole with an outer Ethernet header 1020 (which specifies a TRILL Ethertype) and an Ethernet FCS 1022. As depicted, the TRILL header begins with a collection of fields 1030 including a TRILL version field (V), a reserved field (R), a multi-destination bit (M) indicating whether the TRILL data frame is a multidestination frame, an op-length field (OpLen) that gives the length of the TRILL header optional fields, if any, terminating the TRILL header, and a hop count field (HC) decremented by each RB "hop" as TRILL data frame 1000 is forwarded in TRILL campus 200. The TRILL header additionally includes an egress RB nickname field 1032 that, for UC data frames, identifies by RB nickname the last RB (i.e., egress RB) in TRILL campus 200 that will handle the data frame and is therefore responsible for decapsulating native Ethernet data frame 1010 and forwarding it to an external node. The TRILL header further includes an ingress RB nickname field 1034 that indicates the RB nickname of the edge RB. As indicated above, it is preferable if the specified RB nickname is the RB nickname of the edge switch RB (e.g., RB4) rather than the RB nickname of the edge vRB (e.g., vRB9).

Figure 11:
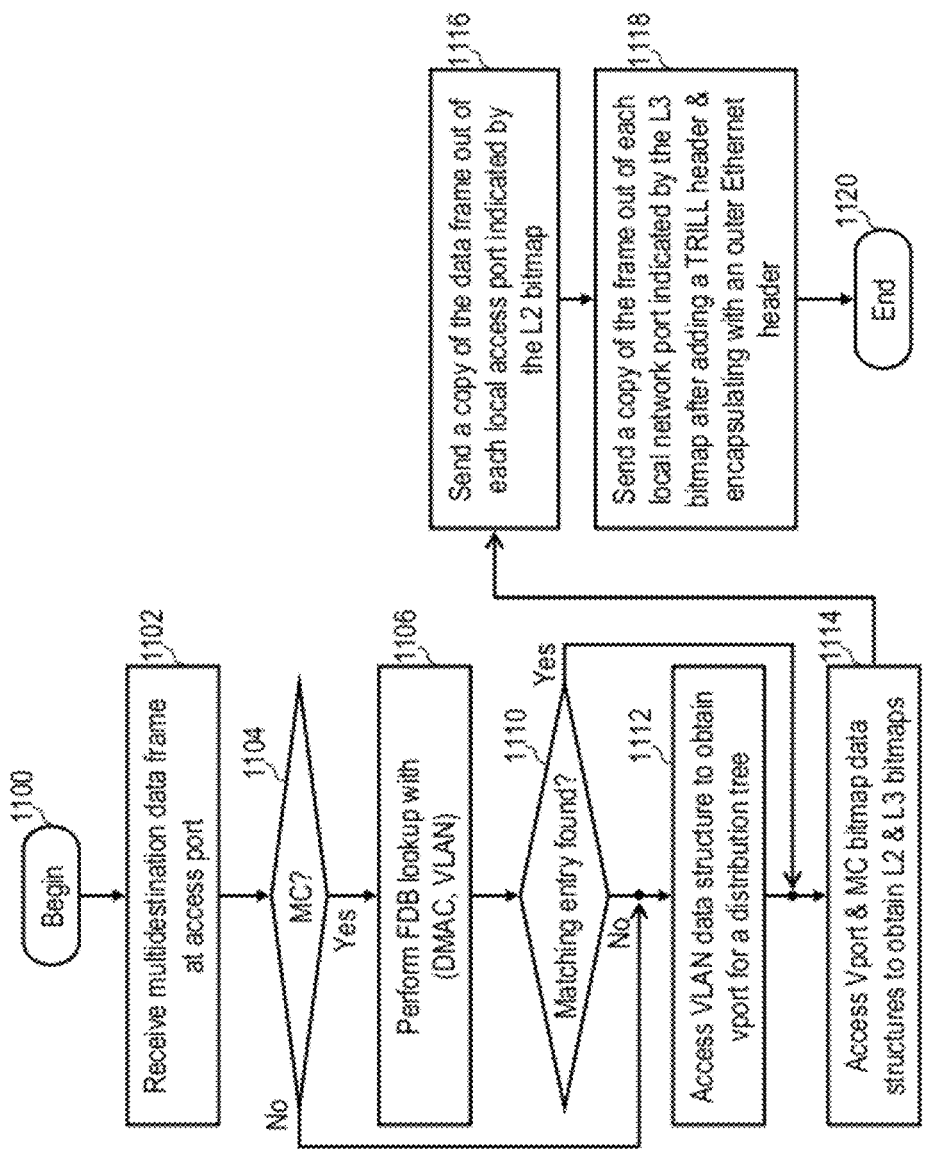
FIG. 11 is a high level logical flowchart of an exemplary process by which an edge RB (or vRB) of a TRILL campus implements forwarding for multidestination (MC/BC/DLF) traffic ingressing the TRILL campus in accordance with one embodiment.

With reference now to FIG. 11, there is illustrated a high level logical flowchart of an exemplary process by which an edge RB (or vRB) of TRILL campus 200 implements forwarding for multidestination (MC/BC/DLF) traffic ingressing TRILL campus 200 in accordance with one embodiment. The process begins at block 1100 and then proceeds to block 1102, which depicts an edge RB of TRILL campus 200 receiving a multidestination data frame at an access port (e.g., a port 602 coupled to one of external links 212*a*-212*i*). In response to receipt of the multidestination data frame, the edge RB determines at block 1104 if the multidestination frame is a MC data frame. If, for example, the data frame is an Ethernet data frame, an MC data frame can be detected by determining whether the least significant bit of the DMAC specified by the data frame is set. In response to a determination at block 1104 that the data frame is not a MC data frame, the process proceeds to block 1112, which is described below. If, however, the edge RB determines at block 1104 that the multidestination frame is a MC data frame, the edge RB performs a lookup in FDB data structure 640 based on a tuple including the DMAC and VLAN specified in the data frame (block 1106).

As indicated at block 1110, if a matching entry is located in FDB data structure 640, the vport for the distribution tree for the multidestination data frame is returned, and the process proceeds to block 1114, which is described below. If, however, no matching entry for the multidestination data frame is found in FDB data structure 640, the edge RB accesses VLAN data structure 652 to obtain the vport for the distribution tree (block 1112). In addition, the edge RB accesses vport data structure 644 and MC bitmap data structure 650 to obtain L2 and L3 bitmaps for the data frame (block 1114).

The edge RB then sends a copy of the native data frame out of each local access port, if any, indicated by the L2 bitmap (block 1116), which are the local access port(s) of the edge RB connected to external links 212 outside of TRILL campus 200. In addition, the edge RB adds a TRILL header and an outer encapsulating Ethernet header to the data frame and sends the encapsulated data frame out of each local network port, if any, of TRILL campus 200 indicated by the L3 bitmap (block 1118). Thereafter, the multidestination forwarding process of FIG. 11 terminates at block 1120.

Figure 12:
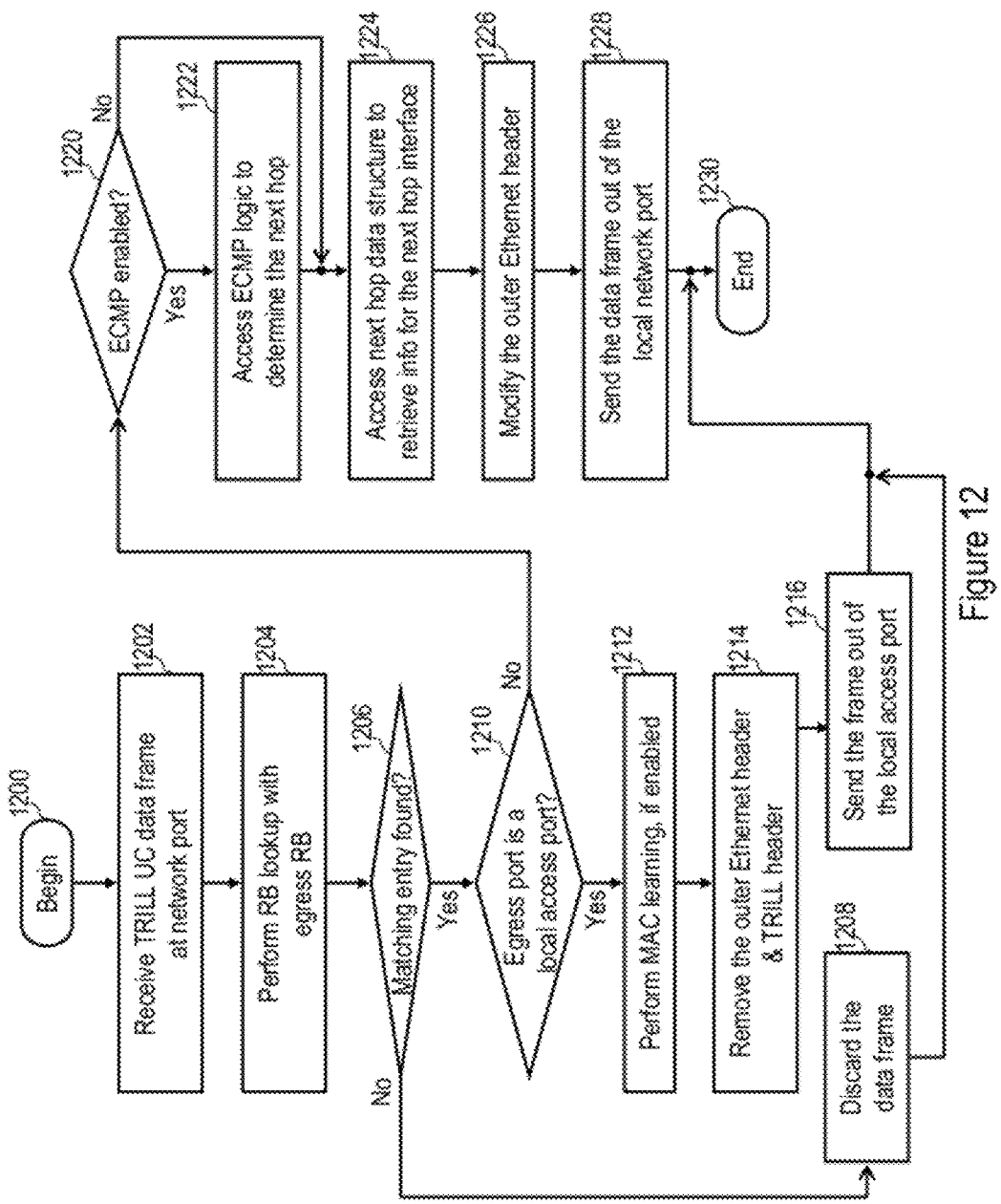
FIG. 12 is a high level logical flowchart of an exemplary process by which an RB (or vRB) of a TRILL campus implements forwarding for UC traffic received at a network port coupled to an internal link of the TRILL campus in accordance with one embodiment.

Referring now to FIG. 12, there is illustrated a high level logical flowchart of an exemplary process by which an RB (or vRB) of TRILL campus 200 implements forwarding for UC traffic received at a network port coupled to an internal link 202 of TRILL campus 200 in accordance with one embodiment. The process begins at block 1200 and then proceeds to block 1202, which depicts an RB of TRILL campus 200 receiving a UC data frame at a network port coupled to an internal link 202 of TRILL campus 200. In response to receipt of the UC data frame, the RB performs a lookup in RB data structure 642 based on the egress RB specified in egress RB nickname field 1032 of the TRILL header of the data frame. As indicated at block 1206, if no matching entry for the data frame is found in RB data structure 642, the RB discards the UC data frame. Thereafter, the UC forwarding process depicted in FIG. 12 ends at block 1230.

Returning to block 1206, in response to finding a matching entry for the egress RB in RB data structure 642, the RB determines whether or not the egress port indicated by RB data structure 640 is a local access port, that is, a port connected to an external link 212. If not (i.e., the egress port is a network port), the process proceeds to block 1220, which is described below. If, however, the RB determines at block 1210 that the egress port is a local access port, the RB performs MAC learning for the data frame, if enabled (block 1212). An exemplary process for MAC learning is described below with reference to FIG. 18. The RB then decapsulates the native L2 data frame by removing outer Ethernet header 1020 and the TRILL header (block 1214) and sends the native L2 data frame out of the local access port indicated by RB data structure 642.

Referring to block 1220, the RB determines whether ECMP is enabled. If not, the process proceeds to block 1224, described below. If, however, ECMP is enabled, the RB accesses ECMP data structure 646 to determine the next hop for the data frame (block 1222). Following either block 1220 (if ECMP is disabled) or block 1222 (if ECMP is enabled), the RB accesses next hop data structure 648 to retrieve information for the next hop interface (block 1224). Thereafter, the RB modifies the outer encapsulating Ethernet header of the UC data frame to specify the appropriate source and destination MAC addresses (block 1226) and sends the data frame out of a local network port to the next hop in TRILL campus 200 (block 1228). Thereafter, the UC forwarding process depicted in FIG. 12 terminates at block 1230.

Figure 13:
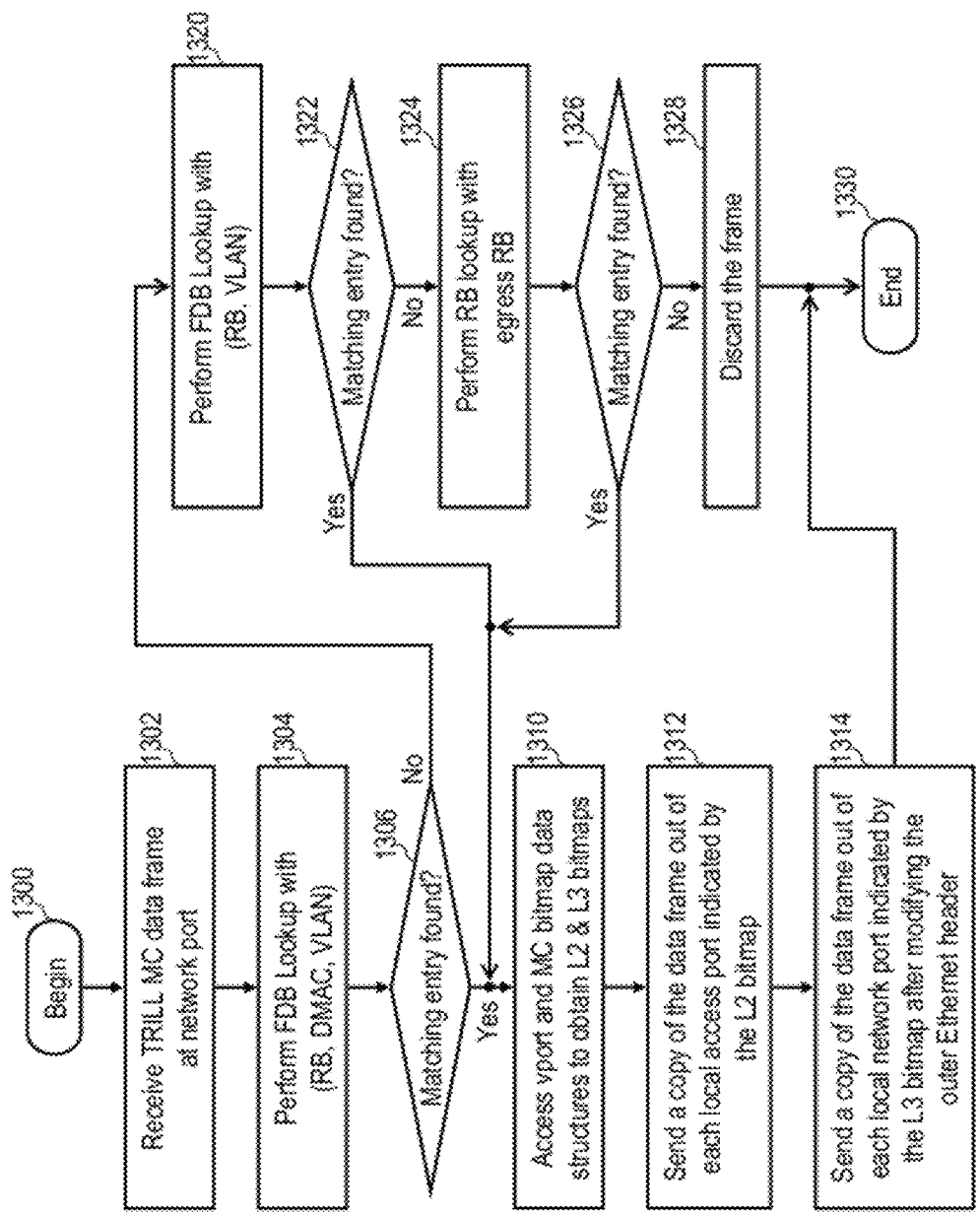
FIG. 13 is a high level logical flowchart of an exemplary process by which an RB (or vRB) of a TRILL campus implements forwarding for MC traffic received at a network port coupled to an internal link of the TRILL campus in accordance with one embodiment.

With reference now to FIG. 13, there is illustrated a high level logical flowchart of an exemplary process by which an RB (or vRB) of TRILL campus 200 implements forwarding for MC data frames received at a network port connected to an internal link 202 of TRILL campus 200 in accordance with one embodiment. The process begins at block 1300 and then proceeds to block 1302, which depicts a RB of TRILL campus 200 receiving a MC data frame at a network port (e.g., a port 602 coupled to one of internal links 202 of TRILL campus 200). In response to receipt of the MC data frame, the RB performs a lookup in FDB data structure 640 based on a tuple including the RB and the DMAC and VLAN specified in the data frame (block 1304).

As indicated at block 1306, if no matching entry is located in FDB data structure 640, the process proceeds to block 1320, which is described below. In response to the RB locating a matching entry for the MC data frame in FDB data structure 640, the vport for the distribution tree for the MC data frame is returned, and the process proceeds to block 1310. At block 1310, the RB accesses vport data structure 644 and MC bitmap data structure 650 to obtain L2 and L3 bitmaps for the data frame. The RB then sends a copy of the data frame out of each local access port, if any, indicated by the L2 bitmap (block 1312), which are the local access port(s) of the RB connected to external links 212 outside of TRILL campus 200. In addition, the RB sends a copy of the data frame out of each local network port, if any, of TRILL campus 200 indicated by the L3 bitmap after updating the outer encapsulating Ethernet header of the MC data frame to specify the appropriate source MAC addresses (block 1314). Thereafter, the MC forwarding process of FIG. 13 terminates at block 1330.

Referring now to block 1320, the RB performs a lookup for the MC data frame in FDB data structure 640 based on a tuple including the identifier of the RB and the VLAN specified by the MC data frame. If the RB determines at block 1322 that a matching entry for the MC data frame is found in FDB data structure 640, RB forwards the MC data frame as has been described with respect to blocks 1310-1314. If, however, the RB determines at block 1322 that no matching entry for the data frame is present in FDB data structure 640, the RB performs a lookup in RB data structure 642 utilizing the egress RB specified in egress RB nickname field 1032 of the TRILL header of the data frame (block 1324). If the RB determines at block 1326 that a matching entry for the data frame is present in RB data structure 642, the RB forwards the MC data frame as has been described with respect to blocks 1310-1314. If, however, the RB determines at block 1326 that no matching entry for the data frame is found in RB data structure 642, the RB discards the data frame at block 1328. Thereafter, the MC data frame forwarding process depicted in FIG. 13 terminates at block 1330.

Figure 14:
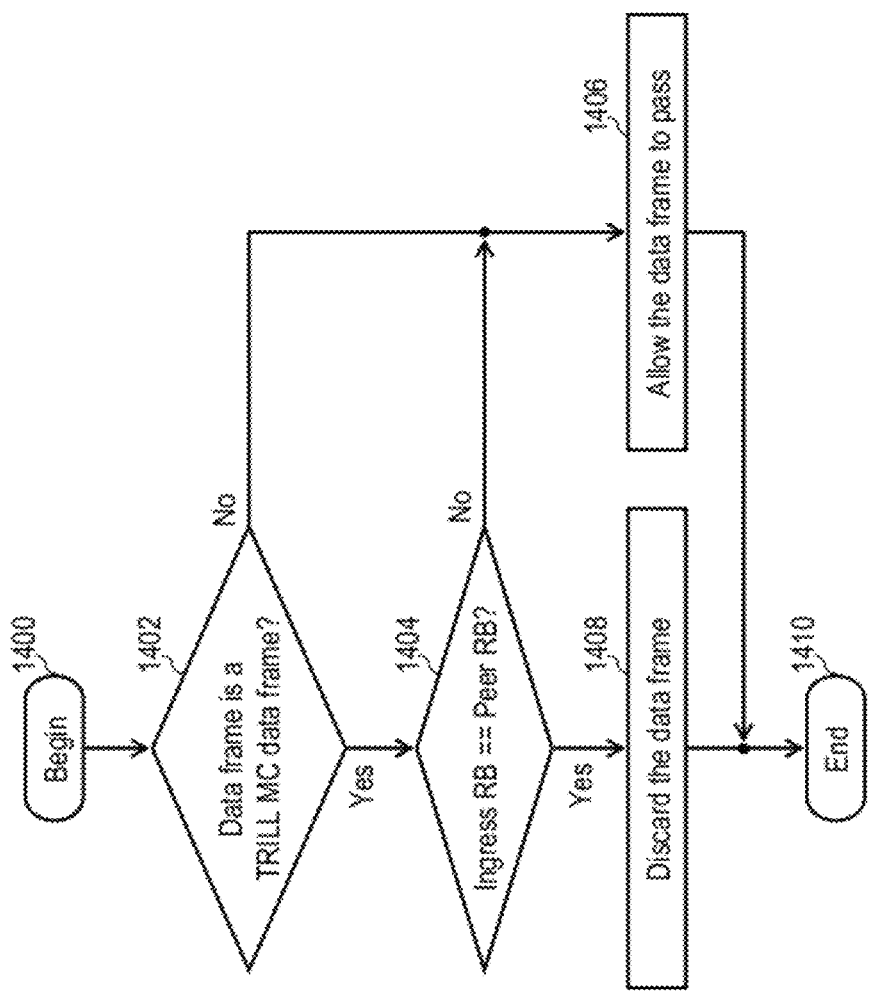
FIG. 14 is high level logical flowchart of an exemplary process by which an ACL installed at an egress t-LAG port of an edge RB of a TRILL campus can be applied to prevent frame looping for multidestination traffic in accordance with one embodiment.

Referring now to FIG. 14, there is depicted a high level logical flowchart of an exemplary process by which an ACL installed at an egress t-LAG port of an edge RB of a TRILL campus 200 can be applied to prevent frame looping for multidestination traffic in accordance with one embodiment. The process begins at block 1400 in response to an edge RB of a TRILL campus receiving a data frame at an egress local access port configured as part of a t-LAG. As indicated at block 1402, the RB determines whether the data frame is a TRILL MC data frame, for example, by examining the multicast bit in TRILL header fields 1030. In response to a determination that the data frame is not a TRILL MC data frame, the RB allows the data frame to egress through the local access port (block 1406).

If, however, the RB determines at block 1402 that the data frame is a TRILL MC data frame, the RB applies an ACL at block 1404 by determining whether or not the RB identified in ingress RB nickname field 1034 of the TRILL header is a peer RB belonging to the same t-LAG cluster as the current RB. If not, the RB allows the data frame to egress through the local access port (block 1406). If, however, the RB determines that the RB identified in the ingress RB nickname field 1034 of the TRILL header is a peer RB belonging to the same t-LAG cluster as the current RB, the RB enforces the ACL by discarding the data frame (block 1408), thus preventing frame looping. Following block 1406 or block 1408, the process depicted in FIG. 14 terminates at block 1410.

As an alternative to the process depicted in FIG. 14, source pruning for TRILL multidestination frames can be performed by employing a different distribution tree for frames entering at different switch RBs supporting a t-LAG cluster. For example, in TRILL campus 200, vRB9 can implement source pruning for multidestination traffic by employ differing distribution trees for each combination of switch RB (i.e., RB4 or RB6) and t-LAG.

Figure 31:
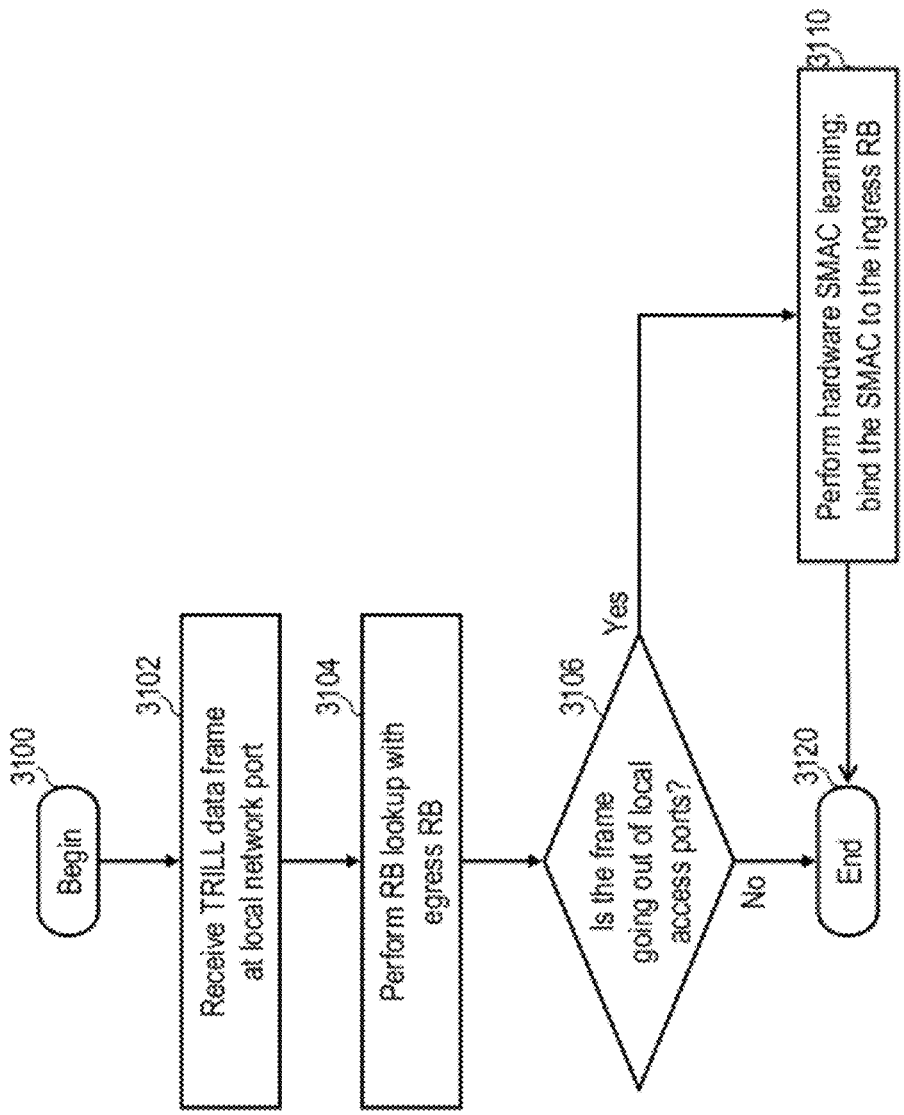
FIG. 31 is a high level logical flowchart of a prior art process of MAC learning in a conventional TRILL network.

In a conventional TRILL campus, MAC learning is performed at egress RBs to bind the SMAC of a data frame exiting the TRILL campus to the ingress RB. A prior art MAC learning process in a conventional TRILL campus is shown in FIG. 31. The depicted process begins at block 3100 and then proceeds to block 3102, which illustrates an egress RB of a conventional TRILL campus receiving a TRILL data frame at one of its local network ports. In response to receipt of the TRILL data frame, the egress RB performs an RB lookup in its RB data structure based on the egress RB nickname specified in the TRILL header of the TRILL data frame (block 3104).

If the egress RB determines at block 3106 the destination port returned by the RB lookup is not a local access port, then the conventional MAC learning process depicted in FIG. 31 terminates at block 3120. If, on the other hand, the egress RB determines at block 3106 that the destination port returned by the RB lookup is a local access port (i.e., the local RB is the egress RB for the TRILL data frame), then the egress RB performs hardware SMAC learning and binds the SMAC to the ingress RB indicated by the TRILL header of the TRILL data frame (block 3110). Thereafter, the process depicted in FIG. 31 ends at bock 3120.

Figure 18:
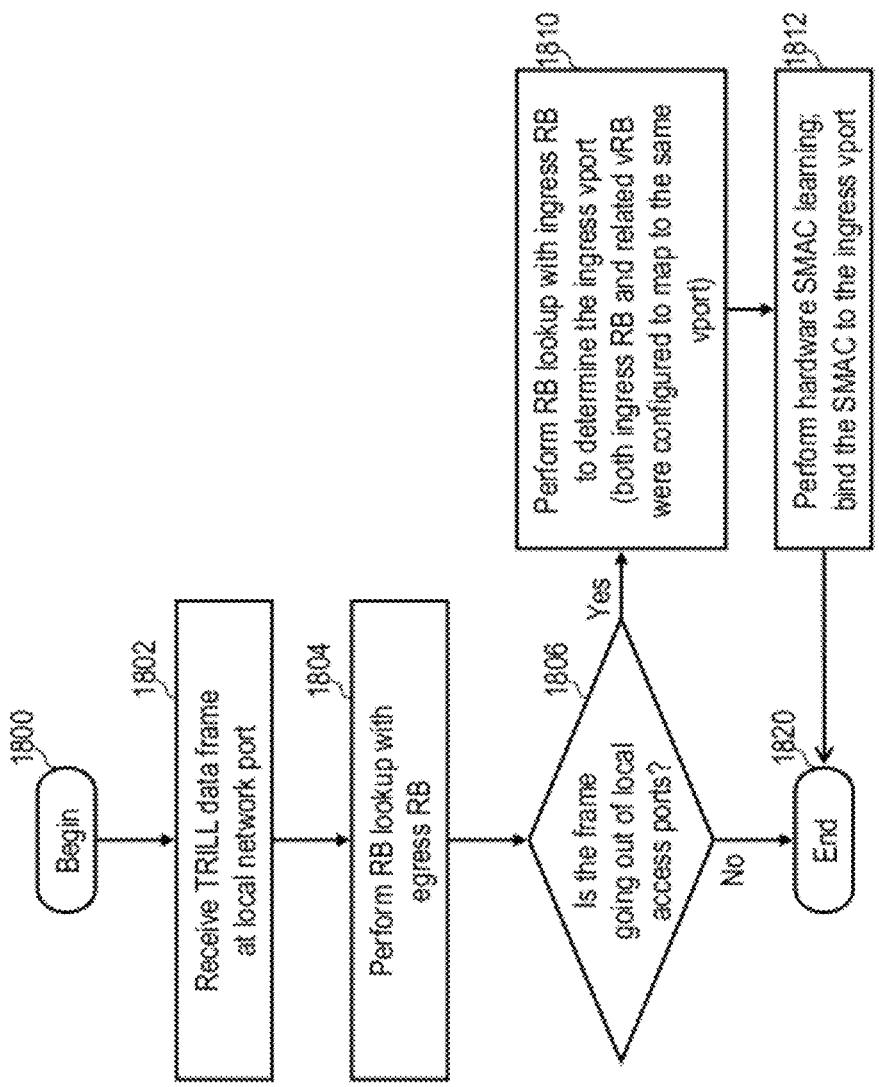
FIG. 18 is a high level logical flowchart of an exemplary process by which an egress RB of a TRILL campus implements MAC learning in response to a TRILL data frame in accordance with one embodiment.

In a preferred embodiment, the conventional MAC learning process depicted in FIG. 31 is replaced in TRILL campus 200 with a more comprehensive MAC learning methodology supporting the use of t-LAGs and t-LAG clusters as described herein. This comprehensive MAC learning methodology includes MAC learning at t-LAG ports of ingress RBs (e.g., as depicted in FIG. 15), MAC learning at RBs in the same t-LAG cluster as an edge RB (e.g., as illustrated in FIG. 16), and MAC learning at egress RBs that binds SMACs to ingress vports (e.g., as depicted in FIG. 18).

With reference now to FIG. 15, there is illustrated a high level logical flowchart of an exemplary process by which an ingress RB of a TRILL campus 200 performs MAC learning at a t-LAG port in accordance with one embodiment. As shown, the process begins at block 1500 and then proceeds to block 1502, which depicts an ingress RB of a TRILL campus 200 receiving a native L2 data frame at a local access port connected to an external link 212. In response to receipt of the native L2 data frame, the ingress RB performs a lookup of the data frame in FDB data structure 640 using the SMAC address specified by the data frame (block 1504).

The ingress RB then determines at block 1506 whether or not the FDB entry obtained by the lookup performed at block 1504 is newly learned at a local access port that is configured in a t-LAG. If not, the process depicted in FIG. 15 terminates at block 1520. If, however, a determination is made at block 1506 that the entry obtained by the FDB lookup is newly learned at a local access port configured in a t-LAG, the contents of the FDB entry are passed to software for MAC learning (block 1510). Software accordingly binds the SMAC of the data frame to the ingress vRB if the ingress local access port is a t-LAG port (block 1512). Binding the SMAC of the data frame to the ingress vRB (rather than ingress RB) in this manner supports the automatic load balancing and fault tolerant communication described herein. The ingress RB then passes the contents of the FDB entry to all other RBs of TRILL campus 200 via ESADI (block 1514). Thereafter, the process illustrated in FIG. 15 ends at block 1520.

Referring now to FIG. 16, there is depicted a high level logical flowchart of an exemplary process by which an egress RB of a TRILL campus 200 performs MAC learning in accordance with one embodiment. The process begins at block 1600 and then proceeds to block 1602, which illustrates an egress RB of TRILL campus 200 receiving an ESADI frame from another RB in TRILL campus 200. The ESADI frame can be originated, for example, at block 1514 of the ingress RB MAC learning process depicted in FIG. 15. In response to receipt of the ESADI frame, the egress RB determines at block 1604 whether or not it is configured within a common t-LAG cluster with the remote RB from which the ESADI frame originated. If not, the egress RB configures its switch controller 630 to bind the SMAC to a vport for the ingress vRB of the traffic flow (block 1610). If, however, the egress RB determines at block 1604 that is configured in the same t-LAG cluster as the remote RB, the egress RB configures its switch controller 630 to bind the SMAC to a local t-LAG port of the t-LAG cluster (block 1606). Following either block 1606 or block 1610, the egress RB MAC learning process depicted in FIG. 16 terminates at block 1612.

With reference now to FIG. 17, there is illustrated a high level logical flowchart of an exemplary method of configuring a RB of a TRILL campus to support a t-LAG in accordance with one embodiment. The process begins at block 1700 and then proceeds to block 1702, which illustrates a RB of TRILL campus 200 receiving a t-LAG configuration specifying which ports 602 of the RB belong to a link aggregation group (LAG). In response to receipt of the t-LAG configuration, the RB configures switch controller 630 to map both vRB(s) and switch-based (i.e., physical) RBs in the same t-LAG to the same vport (block 1704). Mapping both vRBs and RBs in the same t-LAG to the same vport in this manner supports the egress RB MAC learning process described below with reference to FIG. 18. Following block 1704, the process of FIG. 17 ends at block 1706.

Referring now to FIG. 18, there is depicted a high level logical flowchart of an exemplary process by which an egress RB of a TRILL campus implements MAC learning in response to a TRILL data frame in accordance with one embodiment. As shown, the process begins at block 1800 and then proceeds to block 1802, which illustrates an egress RB of TRILL campus 200 receiving a TRILL data frame 1000 as illustrated in FIG. 10 via an internal link 202 of TRILL campus 200 at one of its local network ports. In response to receipt of the TRILL data frame, the egress RB performs a lookup in RB data structure 642 based on the egress RB nickname specified in the egress RB nickname field 1032 of the TRILL header (block 1804).

If the egress RB determines the destination port returned by the RB lookup is not a local access port, but is instead a vport for a remote RB (block 1806), then the process depicted in FIG. 18 terminates at block 1820. If, on the other hand, the egress RB determines at block 1806 that the destination port returned by the RB lookup is a local access port, then the egress RB again performs a lookup in RB data structure 642 based on the ingress RB nickname specified in the ingress RB nickname field 1034 of the TRILL header in order to determine the ingress vport (block 1810). As noted above with reference to FIG. 17, both the ingress RB and any related vRB are preferably configured to map to the same vport. The egress RB then performs hardware SMAC learning and binds the SMAC to the ingress vport returned by the second RB lookup (block 1812). Thereafter, the process depicted in FIG. 18 ends at bock 1820.

Figure 19:
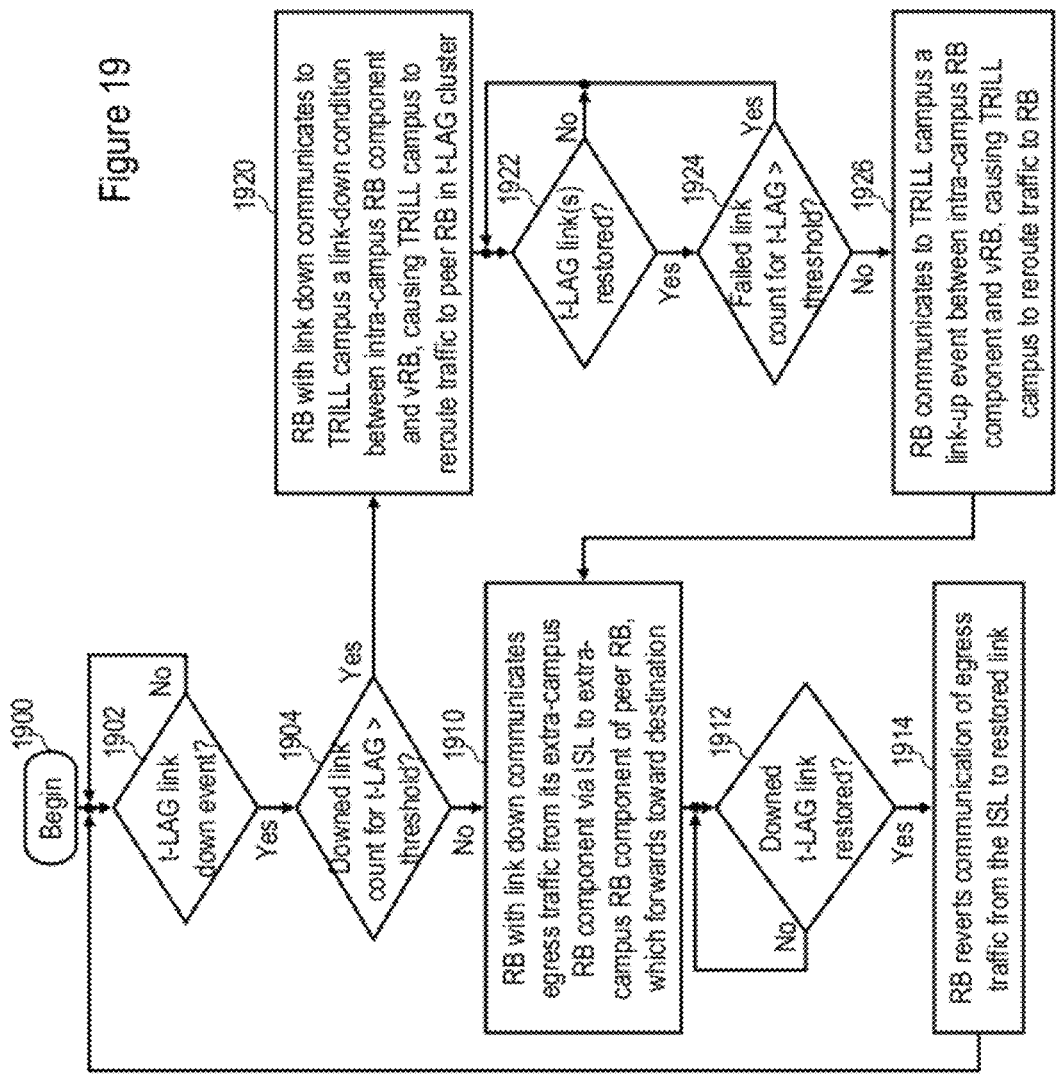
FIG. 19 is a high level logical flowchart of an exemplary process by which an RB of a TRILL campus supports fault tolerant communication via a t-LAG in accordance with one embodiment.

With reference now to FIG. 19, there is illustrated a high level logical flowchart of an exemplary process by which a RB of TRILL campus 200 provides fault-tolerant communication via a t-LAG cluster in accordance with one embodiment. The process begins at block 1900 and then proceeds to block 1902, which depicts an RB supporting a t-LAG (hereafter assumed for the sake of example to be RB4) determining whether or not a t-LAG link-down event has been detected for one of its external links 212. If not, the process iterates at block 1902 until a t-LAG link-down event is detected for one of its external links 212.

In response to RB4 detecting a link-down event for one of its external links 212, RB4 determines at block 1904 whether the number of its currently downed links exceeds a predetermined threshold (in at least some embodiments, RBs (or vRBs at different RBs) can have different numbers of external links and different thresholds). If so, the process proceeds to block 1920, which is described below. If, however, RB4 determines at block 1904 that the number of its current downed links does not exceed the predetermined threshold, the process proceeds to block 1910.

Figure 20:
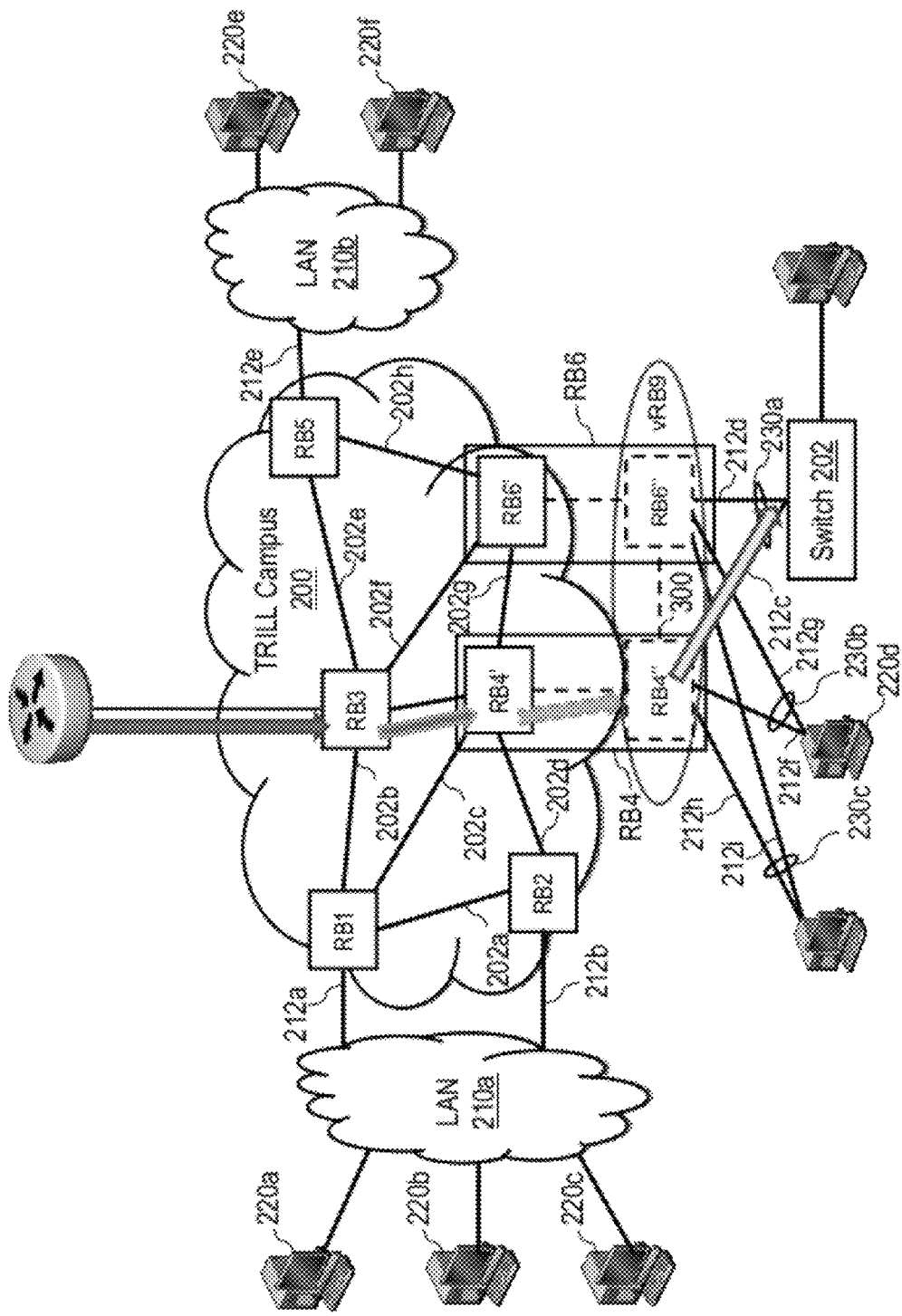
FIGS. 20-21 illustrate an exemplary network environment in which, in the event of a failure of link of a t-LAG, unicast traffic is redirected via the t-LAG ISL to a peer RB in the same t-LAG cluster for egress through a healthy t-LAG link.
Figure 21:
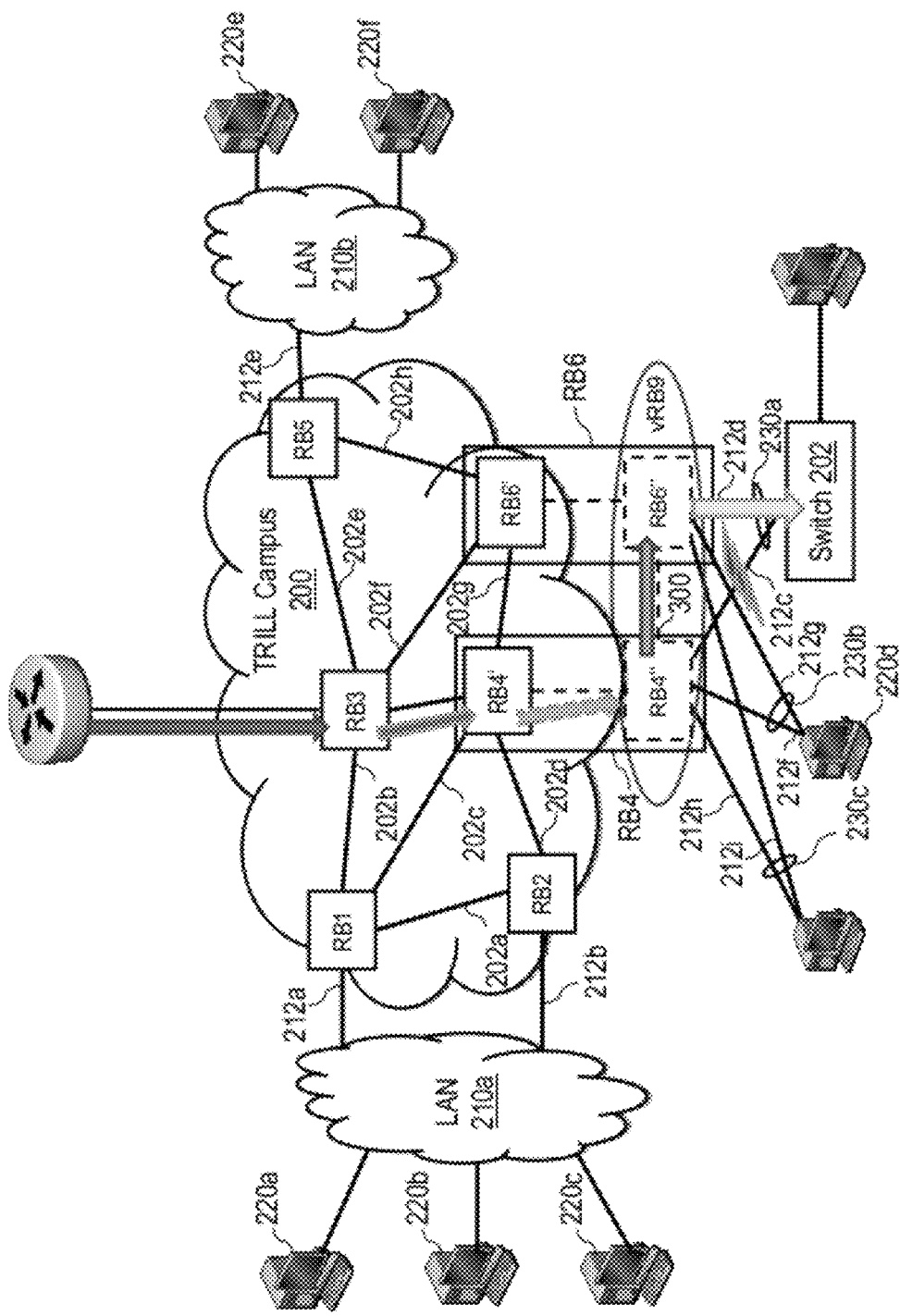

At block 1910, RB4 utilizes an ISL of the t-LAG cluster to redirect egress traffic of TRILL campus 200 that was directed to the downed link. For example, FIG. 20 depicts an exemplary flow of UC traffic via TRILL campus 200 to an external node (i.e., switch 202) via a t-LAG 230*a* prior to a link down event. If an external link, such as external link 212*c*, fails as shown in FIG. 21, RB4", the extra-campus component of RB4, redirects the UC traffic via t-LAG ISL 300 to the peer RB (i.e., RB6") in the same t-LAG cluster for egress through a healthy t-LAG link, such as link 212*d*.

As depicted at block 1912, during and after the redirection RB4 continues to monitor to determine if its downed external link 212 has been restored. In response to detection that the downed external link (e.g., link 212*c*) is restored, RB4 reverts communication of egress traffic from t-LAG ISL 300 to the restored external link (block 1914). Thereafter, the process returns to block 1902, which has been described.

Figure 22:
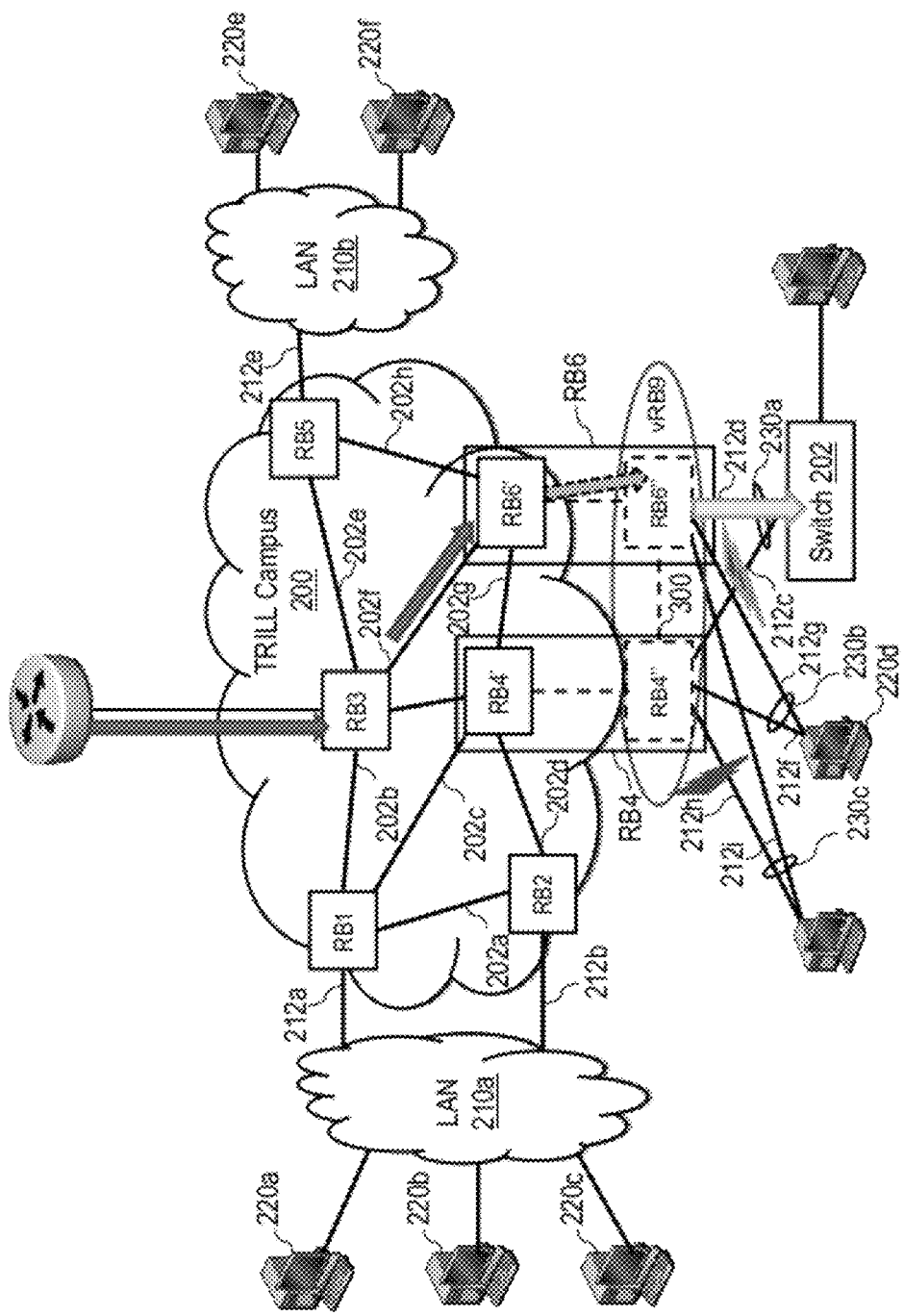
FIG. 22 depicts an exemplary network environment in which, if the number of failed t-LAG links exceeds a predetermined threshold, unicast traffic is rerouted to a different egress RB.

Referring now to block 1920, in response to a determination of RB4 that the number of its downed external links 212 exceeds the threshold, RB4 reports a link-down condition (e.g., via TRILL IS-IS) to TRILL campus 200 indicating that the connectivity between its intra-campus RB (i.e., RB4') and the vRB including its extra-campus RB (i.e., RB4") is down (even though the actual link failure events impact external links 212). In response, TRILL campus 200 automatically reroutes traffic that was previously routed to RB4 to a peer RB of the t-LAG cluster for egress. One example of this rerouting behavior is shown in FIG. 22, which depicts TRILL campus 200 automatically rerouting egress UC traffic intended for switch 202 from RB4 to RB6, which transmits the egress traffic to switch 202 via external link 212d of the t-LAG cluster.

During the rerouting illustrated at block 1920, RB4 further determines at block 1922 whether or not one or more of its downed external links 212 have been restored. If so, RB4 additionally determines at block 1924 whether or not the number of its external links 212 that are down still exceeds the threshold. If so the process returns to block 1922. If, however, RB4 determines at block 1924 that the restoration of one or more external links 212 has caused the number of its external links 212 that are down to not exceed the threshold, RB4 communicates to TRILL campus 200 a link-up event for the link between its intra-campus RB (i.e., RB4') and the vRB (i.e., vRB9) including its extra-campus RB (i.e., RB4"). In response, TRILL campus 200 re-establishes routing for the egress traffic through RB4, as shown in FIG. 20.

Figure 23:
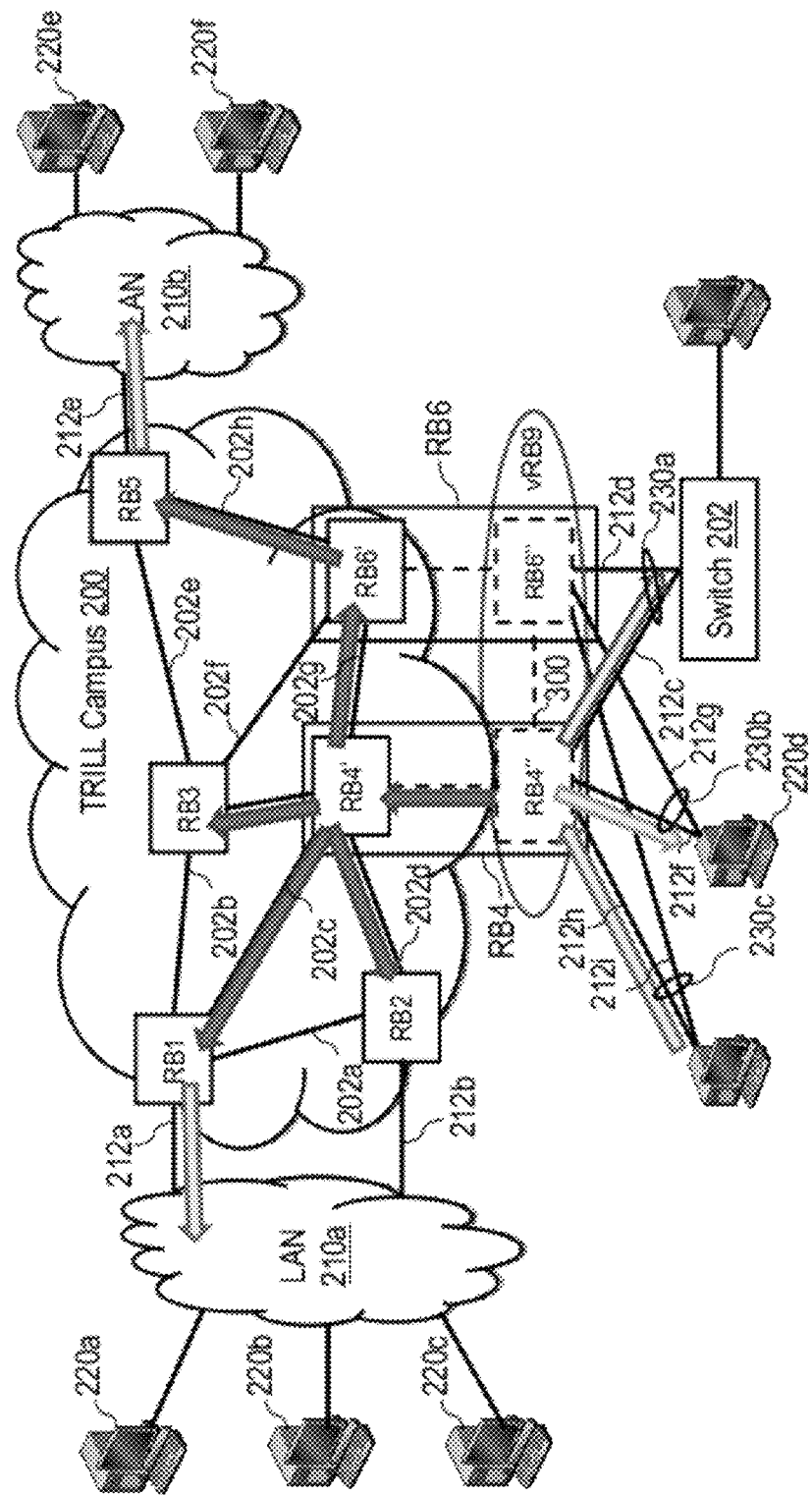
FIGS. 23-24 illustrate an exemplary network environment in which, in the event of a failure of a t-LAG link, the t-LAG ISL is used to pass multidestination traffic to a peer RB in the same t-LAG cluster, which then sends egress frames out.
Figure 24:
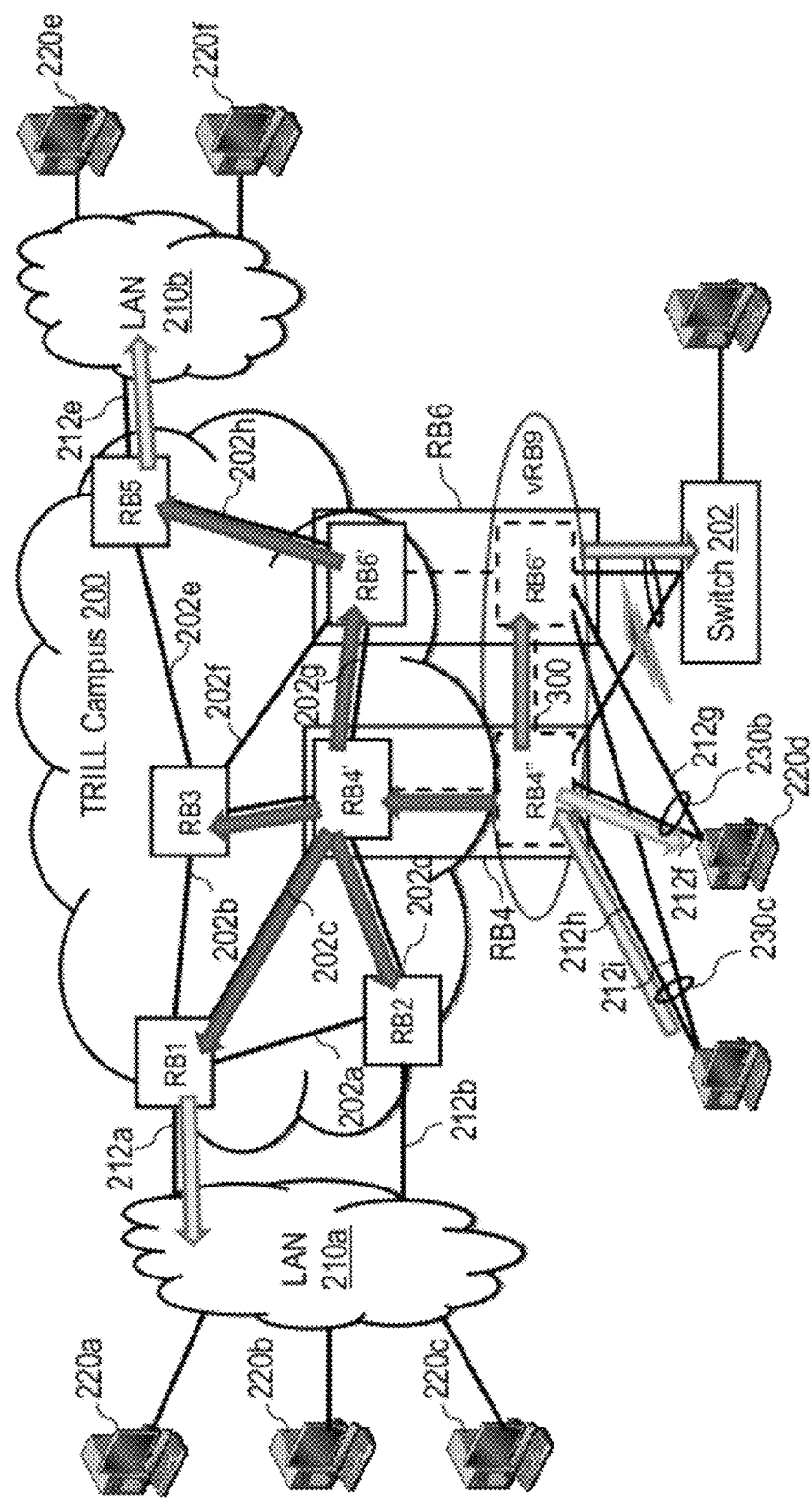

FIGS. 23-24 illustrate that the same technique depicted in FIG. 19 can be utilized to provide fault-tolerant communication for multidestination traffic ingressing at a t-LAG cluster. For example, assuming a multidestination flow (e.g., broadcast flow) ingresses TRILL campus 200 on external link 212h of t-LAG 230c, vRB9 can distribute the multidestination flow to TRILL campus 200 and its external nodes utilizing a distribution tree rooted at vRB9, as shown in FIG. 23. In response to a link-down event for an external link (e.g., external link 212c) of a t-LAG cluster supporting the multidestination flow, RB4 can utilize t-LAG ISL 300 to redirect the multidestination traffic to the peer RB (RB6") in the same t-LAG cluster in order to send out the egress frames to external switch 202, as shown in FIG. 24. Further, in response to failure of a number of external links 212 of the t-LAG cluster that exceeds a threshold, RB4 can report a link down between its intra-campus RB4' and vRB9 to TRILL campus 200 in order to enforce use of a different primary link for the egress multidestination traffic directed to the external node coupled to TRILL campus 200 by the downed link until the number of its downed external links is less than or equal to the threshold.

In support of the fault tolerant communication process depicted in FIG. 19, dynamic reconfiguration of RBs is preferably implemented as now described with reference to FIGS. 25-30.

With reference now to FIG. 25, there is illustrated a high level logical flowchart of an exemplary process by which a t-LAG-enabled RB of a TRILL campus is configured by default at startup in accordance with one embodiment. The process begins at block 2500 following startup of a t-LAG-enabled RB of TRILL campus 200 (e.g., RB4 or RB6). The t-LAG-enabled RB then applies a default configuration for traffic flow in the t-LAG, as depicted at blocks 2502-2508. Specifically, the t-LAG-enabled RB configures its switch controller 630 to not allow traffic to flow from any local access port or local network port to the port for t-LAG ISL 300 (blocks 2502 and 2504). In addition, the t-LAG-enabled RB configures its switch controller 630 to not allow traffic to flow from the port for t-LAG ISL 300 to any local access port or local network port (blocks 2506 and 2508). Thereafter, the default t-LAG configuration process illustrated in FIG. 25 ends at block 2510.

Referring now to FIG. 26, there is depicted a high level logical flowchart of an exemplary configuration process at a t-LAG-enabled RB of a TRILL campus in response to a local link-up event in accordance with one embodiment. As shown, the process begins at block 2600 and then proceeds to block 2602, which illustrates a t-LAG-enabled RB of TRILL campus 200 (e.g., RB4 or RB6) detecting a link-up event on a local t-LAG of the RB (block 2602). In response to detecting the link-up event, the t-LAG-enabled RB notifies its peer RB in the t-LAG cluster of the link-up event (block 2604).

In addition, the t-LAG-enabled RB determines at block 2606 whether or not the t-LAG supported by the peer RB of the t-LAG cluster is currently up. If not, the t-LAG-enabled RB configures its switch controller 630 to allow traffic to flow from the port connected to the t-LAG ISL 300 to the local port having the link-up event detected at block 2602 (block 2620). The process then proceeds to block 2622, which depicts the t-LAG-enabled RB initiating a t-LAG reconfiguration, as described in detail below with reference to FIG. 27. Thereafter, the process depicted in FIG. 26 ends at block 2630.

Returning to block 2606, in response to a determination that the t-LAG supported by the peer RB of the t-LAG cluster is currently up, the t-LAG-enabled RB configures its switch controller 630 to not allow traffic to flow from the port connected to the t-LAG ISL 300 to the local port having the link-up event detected at block 2602 (block 2610). In addition, for all MAC entries learned at the t-LAG, the t-LAG-enabled RB updates the MAC entries to bind to the local port that just experienced the link-up event (block 2612). From block 2612, the process proceeds to block 2622 and 2630, which have been described.

With reference now to FIG. 27, there is illustrated a high level logical flowchart of an exemplary t-LAG reconfiguration process in accordance with one embodiment. The process is performed, for example, at block 2622 of FIG. 26, as well as block 2810 of FIG. 28, block 2920 of FIG. 29 and block 3010 of FIG. 30, as described further below.

The process illustrated in FIG. 27 begins at block 2700 and thereafter proceeds to block 2702, which depicts a t-LAG-enabled RB of TRILL campus 200 determining whether or not any local t-LAG link of the RB is down while the t-LAG of a remote RB in the same t-LAG cluster is up, for example, as shown in FIG. 21. If not, the t-LAG-enabled RB configures its switch controller 630 to not allow traffic to flow from any local network port or from any local t-LAG port to the port connected to the t-LAG ISL 300 (blocks 2704 and 2706). If, on the other hand, the t-LAG-enabled RB makes an affirmative determination at block 2702, the t-LAG-enabled RB configures its switch controller 630 to allow traffic to flow from any local network port or from any local t-LAG port to the port connected to the t-LAG ISL 300 (blocks 2710 and 2712). Following either of blocks 2706 or 2712, the t-LAG reconfiguration process illustrated in FIG. 27 ends at block 2714.

Referring now to FIG. 28, there is depicted a high level logical flowchart of an exemplary configuration process at a t-LAG-enabled RB in response to a remote link-up event in accordance with one embodiment. As shown, the process begins at block 2800 and then proceeds to block 2802, which illustrates a t-LAG-enabled RB of TRILL campus 200 (e.g., RB4 or RB6) detecting a link-up event for a remote t-LAG in the same t-LAG cluster. For example, the t-LAG-enabled RB may detect the event based on a notification communicated by a peer RB in the t-LAG cluster as described at block 2604 of FIG. 26.

In response to detecting the link-up event for the remote t-LAG of the t-LAG cluster, the t-LAG-enabled RB determines at block 2804 whether or not the local t-LAG it supports is currently up. If not, the t-LAG-enabled RB initiates a t-LAG reconfiguration, as described with reference to FIG. 27 (block 2810). Thereafter, the process depicted in FIG. 28 ends at block 2812.

Returning to block 2804, in response to a determination by the t-LAG-enabled RB that its t-LAG is currently up, the t-LAG-enabled RB configures its switch controller 630 to not allow traffic to flow from the port connected to the t-LAG ISL 300 to its local t-LAG (block 2806). Thereafter, the process proceeds to block 2810 and 2812, which have been described.

With reference now to FIG. 29, there is illustrated a high level logical flowchart of an exemplary configuration process at a t-LAG-enabled RB of a TRILL campus in response to a local t-LAG link-down event in accordance with one embodiment. The depicted process begins at block 2900 and then proceeds to block 2902, which illustrates a t-LAG-enabled RB of TRILL campus 200 (e.g., RB4 or RB6) detecting a link-down event on a local t-LAG of the RB (block 2902). In response to detecting the link-down event, the t-LAG-enabled RB notifies its peer RB in the t-LAG cluster of the link-down event (block 2904). The t-LAG-enabled RB also configures its switch controller 630 to not allow traffic to flow from the port connected to t-LAG ISL 300 to the port connected to the downed t-LAG link (block 2906).

The t-LAG-enabled RB additionally determines at block 2910 whether or not the t-LAG supported by the peer RB of the t-LAG cluster is currently up. If not, the t-LAG-enabled RB clears all the MAC entries learned for the t-LAG cluster. The process then proceeds to block 2920, which depicts the t-LAG-enabled RB initiating a t-LAG reconfiguration, as described with reference to FIG. 27. Thereafter, the process depicted in FIG. 29 ends at block 2922.

Returning to block 2910, in response to a determination that the t-LAG supported by the peer RB of the t-LAG cluster is currently up, the t-LAG-enabled RB updates the MAC entries to bind entries for the local t-LAG to the port connected to t-LAG ISL 300 (block 2914). From block 2914, the process proceeds to block 2920 and 2922, which have been described.

Referring now to FIG. 30, there is depicted a high level logical flowchart of an exemplary configuration process at a t-LAG-enabled RB in response to a remote link-down event in accordance with one embodiment. The depicted process begins at block 3000 and then proceeds to block 3002, which illustrates a t-LAG-enabled RB of TRILL campus 200 (e.g., RB4 or RB6) detecting a link-down event for a remote t-LAG in the same t-LAG cluster. For example, the t-LAG-enabled RB may detect the event based on a notification communicated by a peer RB in the t-LAG cluster as described at block 2904 of FIG. 29.

In response to detecting the link-down event for the remote t-LAG of the t-LAG cluster, the t-LAG-enabled RB determines at block 3004 whether or not the local t-LAG it supports is currently up. If not, the t-LAG-enabled RB initiates a t-LAG reconfiguration, as described with reference to FIG. 27 (block 3010). Thereafter, the process depicted in FIG. 30 ends at block 3012.

Returning to block 3004, in response to a determination by the t-LAG-enabled RB that its t-LAG is currently up, the t-LAG-enabled RB configures its switch controller 630 to allow traffic to flow from the port connected to the t-LAG ISL 300 to its local t-LAG (block 3006). Thereafter, the process proceeds to block 3010 and 3012, which have been described.

As has been described, the t-LAG support disclosed herein is designed to provide DMLT capability for external network nodes (e.g., switches or servers) connected to a TRILL campus, with all the links in a t-LAG used in an active-active mode for the same VLAN. The use of a virtual-RB for each t-LAG leads to efficient load distribution of UC traffic in the t-LAG. The use of this virtual-RB as the ingress RB in the TRILL encapsulation enables the MAC learning performed at egress RBs to be performed by hardware automatically. In cases in which the switch chips have difficulty in employing the virtual-RB as the source RB, the switch RB can alternatively be used as the ingress RB in TRILL encapsulation.

To support t-LAG, it is preferable if switch chips are capable of handling traffic for multiple RBs, but in some cases switch chips may lack such support in terms of capability or capacity. If such support is lacking, a t-LAG cluster including multiple RBs can be employed to adapt available hardware to provide t-LAG support. All the t-LAGs in a t-LAG cluster need to use just one virtual-RB in this case.

To eliminate frame duplication in a t-LAG for multidestination traffic, a link in a t-LAG is preferably selected as the primary link for multidestination transmission for each specific frame flow. The selection of the primary link for a t-LAG can be system-based or based on a combination of distribution tree, VLAN, and/or DMAC. Actions, such as enforcement of ACLs, are applied at egress RBs to make sure a multidestination frame will not be returned to its originating t-LAG.

Traffic handling in a t-LAG cluster is preferably separated into two domains: one for traffic routing within the TRILL campus and the other for the traffic switching in the regular L2 domain. It is recommended to totally separate the traffic handling in these two domains in a t-LAG cluster. A t-LAG ISL is utilized in a t-LAG cluster between peer RBs to handle the traffic redirection in the event of a local link failure on a t-LAG. The traffic redirection via the t-LAG ISL is employed until a new route or distribution tree for affected traffic can be determined and applied.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data processing system (e.g., server computer, network switch, etc.) executing program code that directs the functions of the present invention, it should be understood that present invention may alternatively be implemented as a program product including a data storage medium/device storing program code that can be processed by a data processing system to implement the functionality. The data storage medium/device can be, for example, an optical or magnetic disk, a volatile or non-volatile memory device, etc.

What is claimed is:
1. A switch, comprising:
   a plurality of ports;
   a switch fabric coupled to the plurality of ports;
   a switch controller that controls switching of data frames between the plurality of ports via the switch fabric, wherein the switch controller is configured to:
      implement a network bridge component that forwards traffic inside a data network and a virtual bridge component that forwards traffic outside of the data network via external links;
      form a virtual bridge including the virtual bridge component, a corresponding virtual bridge component of another switch, and an interswitch link (ISL) between the virtual bridge components;
      in response to a link-down event for an external link among the external links and a threshold number of downed links among the external links not being satisfied, redirect data frames egressing the data network without reporting a link-down condition to the data network, such that the data frames egress the data network via the switch, the ISL and the another switch; and in response to a link-down event for the external link and the threshold number of downed links being satisfied, communicate, to the data network, a link-down condition between the network bridge component and the virtual bridge to cause redirection of the data frames egressing the data network from the switch to the another switch.

2. The switch of claim 1, wherein the data frames comprise unicast frames.

3. The switch of claim 1, wherein:
the external links comprise a first set of external links coupling the switch and the another switch to a first external node;
the switch and the another switch are coupled to a second external node by a second set of links; and
the data frames comprise multidestination frames received by the virtual bridge from the external node via one of the second set of links.

4. The switch of claim 1, wherein the switch controller is further configured to revert redirection of data frames egressing the data network from the another switch to the switch and the ISL in response to a transition from the threshold number being satisfied to the threshold number no longer being satisfied.

5. The switch of claim 1, wherein the switch is further configured in response to a link-up event for the external link having the link-down event, to bind, to the external link, all media access control (MAC) entries learned while the external link was down that associate MAC addresses with the ISL and to thereafter restore traffic flow via the external link.

6. A program product, comprising:
a non-transitory data storage device; and
program code stored within the data storage device and executable to cause a switch to:
implement a network bridge component that forwards traffic inside a data network and a virtual bridge component that forwards traffic outside of the data network via external links;
form a virtual bridge including the virtual bridge component, a corresponding virtual bridge component of another switch, and an interswitch link (ISL) between the virtual bridge components;
in response to a link-down event for an external link among the external links and a threshold number of downed links among the external links not being satisfied, redirect data frames egressing the data network without reporting a link-down condition to the data network, such that the data frames egress the data network via the switch, the ISL and the another switch; and
in response to a link-down event for the external link and the threshold number of downed links being satisfied, communicate, to the data network, a link-down condition between the network bridge component and the virtual bridge to cause redirection of the data frames egressing the data network from the switch to the another switch.

7. The program product of claim 6, wherein the data frames comprise unicast frames.

8. The program product of claim 6, wherein:
the external links comprise a first set of external links coupling the switch and the another switch to a first external node;
the switch and the another switch are coupled to a second external node by a second set of links; and
the data frames comprise multidestination frames received by the virtual bridge from the external node via one of the second set of links.

9. The program product of claim 6, wherein the program code is executable to further cause the switch to revert redirection of data frames egressing the data network from the another switch to the switch and the ISL in response to a transition from the threshold number being satisfied to the threshold number no longer being satisfied.

10. The program product of claim 6, wherein the program code is further executable to cause the switch in response to a link-up event for the external link having the link-down event, to bind, to the external link, all media access control (MAC) entries learned while the external link was down that associate MAC addresses with the ISL and to thereafter restore traffic flow via the external link.

* * * * *